US010855508B2

(12) United States Patent
Li et al.

(10) Patent No.: US 10,855,508 B2
(45) Date of Patent: Dec. 1, 2020

(54) RESOURCE CONFIGURATION METHOD AND APPARATUS

(71) Applicant: HUAWEI TECHNOLOGIES CO., LTD., Guangdong (CN)

(72) Inventors: Junchao Li, Shanghai (CN); Chi Zhang, Shanghai (CN); Zhengwei Gong, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 32 days.

(21) Appl. No.: 16/272,748

(22) Filed: Feb. 11, 2019

(65) Prior Publication Data
US 2019/0173715 A1 Jun. 6, 2019

Related U.S. Application Data

(63) Continuation of application No. PCT/CN2017/096728, filed on Aug. 10, 2017.

(30) Foreign Application Priority Data

Aug. 11, 2016 (CN) .......................... 2016 1 0665455

(51) Int. Cl.
*H01L 27/26* (2006.01)
*H04W 24/02* (2009.01)
(Continued)

(52) U.S. Cl.
CPC ........ *H04L 27/2656* (2013.01); *H04L 1/0013* (2013.01); *H04L 5/0005* (2013.01);
(Continued)

(58) Field of Classification Search
None
See application file for complete search history.

(56) References Cited

U.S. PATENT DOCUMENTS

2011/0199944 A1 8/2011 Chen et al.
2011/0300890 A1 12/2011 Hoshino et al.
(Continued)

FOREIGN PATENT DOCUMENTS

CN 101877865 A 11/2010
CN 102771171 A 11/2012
(Continued)

OTHER PUBLICATIONS

International Search Report, dated Oct. 26, 2017, in International Application No. PCT/CN2017/096728 (4 pp.).
(Continued)

*Primary Examiner* — Diane L Lo
(74) *Attorney, Agent, or Firm* — Leydig, Voit & Mayer, Ltd.

(57) ABSTRACT

A resource configuration method and an apparatus are provided. The resource configuration method includes: receiving, by user equipment, configuration information sent by a network device, where the configuration information is used to indicate at least one time interval and at least one time-frequency resource unit within the time interval, and the time-frequency resource unit includes a first time-frequency resource subunit and/or a second time-frequency resource subunit; and reconfiguring, by the user equipment, a resource mapping manner and/or a rate matching manner based on the configuration information, so that no downlink receiving or uplink sending is performed by the user equipment on the first time-frequency resource subunit, and adjusting a timing offset of the second time-frequency resource subunit to perform downlink receiving or uplink sending on the second time-frequency resource subunit obtained by adjusting the timing offset. Resource utilization can be improved while ensuring that the user equipment correctly receives data.

19 Claims, 11 Drawing Sheets

(51) Int. Cl.

| | |
|---|---|
| *H04L 5/00* | (2006.01) |
| *H04L 1/00* | (2006.01) |
| *H04W 56/00* | (2009.01) |
| *H04J 11/00* | (2006.01) |
| *H04L 27/26* | (2006.01) |

(52) U.S. Cl.
CPC .......... *H04L 5/0048* (2013.01); *H04L 5/0094* (2013.01); *H04L 27/2621* (2013.01); *H04W 24/02* (2013.01); *H04W 56/0035* (2013.01); *H04W 56/0045* (2013.01); *H04J 11/005* (2013.01); *H04L 5/0073* (2013.01)

(56) References Cited

U.S. PATENT DOCUMENTS

| | | | |
|---|---|---|---|
| 2014/0204807 A1 | 7/2014 | Li et al. | |
| 2016/0036542 A1 | 2/2016 | Gong et al. | |
| 2017/0238190 A1* | 8/2017 | Yang | H04L 5/0048 370/329 |
| 2017/0332358 A1* | 11/2017 | Park | H04W 74/0816 |
| 2019/0141578 A1* | 5/2019 | Tang | H04W 48/10 |

FOREIGN PATENT DOCUMENTS

| | | |
|---|---|---|
| CN | 102869107 A | 1/2013 |
| CN | 103546259 A | 1/2014 |
| CN | 103944668 A | 7/2014 |
| EP | 2670187 A1 | 12/2013 |

OTHER PUBLICATIONS

Written Opinion of the International Searching Authority, dated Oct. 26, 2017, in International Application No. PCT/CN2017/096728 (7 pp.).

R1-121023 Ericsson et al.,"Details of multiplexing of DCI messages",3GPP TSG-RAN WG} #68bis,Jeju, Republic of Korea, Mar. 28-30, 2012,total 3 pages.

R1-122000 Ericsson et al.,"Mapping of ePDCCH to RE",3GPP TSG-RAN WG1 #69,Prague, Czech RepuiJlic, May 21-25, 2012,total 4 pages.

R1-100248 Huawei et al.,"Inter-cell CSI-RS Analysis",3GPP TAG RAN WG1 meeting #Sgbis,Valencia, Slaain, Jan. 18-22, 2009,total 5 pages.

R1-122388 Sharp,"Resource mapping for ePDCCH",3GPP TSG RAN WG1 Meeting #59,Prague, Czech Republic, May 21-25, 2012,total 8 pages.

International Search Report dated Oct. 26, 2017 in corresponding International Application No. PCT/CN2017/096728.

* cited by examiner

RESOURCE CONFIGURATION METHOD AND APPARATUS

CROSS-REFERENCE TO RELATED APPLICATIONS

This application is a continuation of International Application No. PCT/CN2017/096728, filed on Aug. 10, 2017, which claims priority to Chinese Patent Application No. 201610665455.4, filed on Aug. 11, 2016. The disclosures of the aforementioned applications are hereby incorporated by reference in their entireties.

TECHNICAL FIELD

The present disclosure relates to the field of communications technologies, and in particular, to a resource configuration method and an apparatus.

BACKGROUND

With development of wireless network technologies, services that emerge endlessly have an increasing requirement for a radio resource. To adapt to a quick change in a downlink (downlink, DL)/uplink (uplink, UL) service feature in a small coverage network, a dynamic time division duplex (Dynamic Time Division Duplex, D-TDD) technology in a Long Term Evolution (Long Term Evolution, LTE) system attracts increasing attention. The D-TDD indicates that a TDD uplink-downlink subframe configuration is flexibly and quickly switched based on an uplink-downlink service load status in a network, to meet a specific service requirement of the network, thereby improving a throughput of a DL/UL service in the network.

To better obtain performance advantages of flexibility and efficiency of the D-TDD technology and effectively improve a D-TDD performance gain, a series of measurement reference signals (Measurement Reference Signal, MRS) often need to be sent or received between network devices or user equipments (User Equipment, UE). For example, to eliminate inter-cell cross interference shown in FIG. 2 by using technologies such as interference identification, interference suppression, and interference coordination, an interference measurement reference signal (IMRS, Interference Measurement Reference Signal) needs to be sent or received between the network devices or the UEs. The IMRS is one of the MRSs. However, regardless of whether the MRSs are sent or received between the network devices or the UEs, behavior of UE that accesses a link in a current subframe is affected. For example, if a network device receives an MRS, the network device cannot implement downlink sending for UE; or if a network device receives an MRS, the network device cannot implement uplink receiving from UE. Therefore, a current-subframe configuration method is necessarily studied.

In the prior art, to reduce impact caused by MRS measurement between network devices on cell UE on the premise that accuracy of the MRS measurement between the network devices is ensured, an effective method is to configure an MBSFN subframe to send/receive an MRS. As shown in FIG. 3, when a network device needs to receive, in a corresponding subframe, an MRS sent by a neighboring cell network device, the network device instructs UE that belongs to the network device to configure the subframe as an MBSFN subframe. Likewise, when a network device needs to send an MRS in a corresponding subframe, the network device instructs UE that belongs to the network device to configure the subframe as an MBSFN subframe.

In this method for configuring an MBSFN subframe for UE in a cell for measurement between network devices, the UE in the cell cannot perform uplink sending or downlink receiving in the subframe. Actually, in some specific cases, when large-scale interference intensity measurement is performed between the network devices, a very small quantity of MRSs are required. Using resources of an entire subframe for MRS measurement causes a great waste of resources. In addition, in view of a design manner of an MRS, the UE may simultaneously receive the MRS signal for measurement, and this case is not standardized in the prior art.

SUMMARY

Embodiments of the present invention provide a resource configuration method and an apparatus. User equipment is notified of at least one configured time domain resource and/or frequency domain resource for adjustment, so that not only resource utilization can be improved, but also it can be ensured that the user equipment correctly transmits and receives data.

According to a first aspect, a resource configuration method is provided. User equipment receives configuration information sent by a network device, where the configuration information is used to indicate at least one time interval and at least one time-frequency resource unit within the time interval, and the time-frequency resource unit includes a first time-frequency resource subunit and/or a second time-frequency resource subunit. The user equipment reconfigures a resource mapping manner and/or a rate matching manner based on the configuration information, so that no downlink receiving or uplink sending is performed by the user equipment on the first time-frequency resource subunit, and adjusts a timing offset of the second time-frequency resource subunit, where the timing offset may be to move the second time-frequency resource subunit in time domain, so that the user equipment performs downlink receiving or uplink sending on the second time-frequency resource subunit. In this way, the timing offset of the time-frequency resource subunit may be adjusted to ensure that the user equipment correctly transmits and receives data.

According to the first aspect, in a first feasible implementation of the first aspect, preferably, the configuration information may be dynamic signaling or semi-static signaling in a specific format. The specific format may be a specific field, or may be a different field format or length, or the like. When detecting the specific format, the user equipment reconfigures the resource mapping manner and/or the rate matching manner based on the configuration information, so that no downlink receiving or uplink sending is performed by the user equipment on the first time-frequency resource subunit, and adjusts the timing offset of the second time-frequency resource subunit to perform downlink receiving or uplink sending on the second time-frequency resource subunit obtained by adjusting the timing offset.

According to the first aspect, in a second feasible implementation of the first aspect, the first time-frequency resource subunit is located on a time domain resource on which an index of a start basic time domain unit is M and an index of an end basic time domain unit is N, and one basic time domain unit is corresponding to one index. All basic time domain units are sorted in chronological order, and the index may be obtained by sequentially numbering the sorted basic time domain units by using Arabic numerals. If M=N, the first time-frequency subunit includes one basic time domain unit. The second time domain resource subunit is located on a time domain resource on which an index of an end basic time domain unit is M−1 and an index of a start basic time domain unit is M−A; or the second time domain resource subunit is located on a time domain resource on which an index of a start basic time domain unit is N+1 and an index of an end basic time domain unit is N+A, where A is a preset quantity of basic time domain units included in the second time domain resource subunit.

According to the first aspect, in a third feasible implementation of the first aspect, if the configuration information delivered by the network device is sent to all user equipments of the network device, the second time-frequency resource subunit obtained by adjusting the timing offset is used to transmit a measurement signal between the network device and another network device. In other words, the user equipment of the network device may also receive the measurement signal for measurement. The measurement signal may be an MRS. Alternatively, if the configuration information delivered by the network device is sent to specific user equipment of the network device, the second time-frequency resource subunit obtained by adjusting the timing offset is used to transmit a measurement signal between the user equipment and user equipment in a cell adjacent to a cell to which the user equipment belongs.

According to the first aspect, in a first feasible implementation of the first aspect, an indication manner in which the network device indicates, to the user equipment, the at least one time interval and the at least one time-frequency resource unit within the time interval may be as follows: The network device sends first configuration information to the user equipment, and the user equipment receives the first configuration information, where the first configuration information is used to indicate the at least one time interval; and the network device sends second configuration information to the user equipment, and the user equipment receives the second configuration information, where the second configuration information is used to indicate the at least one time-frequency resource unit within the time interval.

According to any one of the first aspect to the fourth feasible implementation of the first aspect, in a fifth feasible implementation of the first aspect, a time domain resource of the time-frequency resource unit may include at least one basic time domain unit, and one basic time domain unit may include one symbol. When indicating the first time-frequency resource subunit within the time interval, the configuration information may indicate the index of the start basic time domain unit on the time domain resource of the first time-frequency resource subunit within the time interval and a total quantity of basic time domain units included in the time domain resource of the first time-frequency resource subunit within the time interval. Alternatively, when indicating the first time-frequency resource subunit within the time interval, the configuration information may indicate the index of the start basic time domain unit on the time domain resource of the first time-frequency resource subunit and the index of the end basic time domain unit on the time domain resource of the first time-frequency resource subunit. In this way, all basic time domain units between the start basic time domain unit and the end basic time domain unit form the first time-frequency resource subunit. It should be noted that when the first time-frequency resource subunit is indicated, if only the time domain resource is indicated but a frequency domain resource is not indicated, a frequency domain of the first time-frequency resource subunit may occupy entire frequency domain bandwidth.

According to any one of the first aspect to the fourth feasible implementation of the first aspect, in a sixth feasible implementation of the first aspect, a frequency domain resource of the time-frequency resource unit may include at least one basic frequency domain unit, and one basic frequency domain unit may include one subcarrier or one resource block pair. When indicating a frequency domain resource of the first time-frequency resource subunit within the time interval, the configuration information may indicate an index of a start basic frequency domain unit on the frequency domain resource of the first time-frequency resource subunit within the time interval and a total quantity of basic frequency domain units included in the frequency domain resource of the first time-frequency resource subunit within the time interval. Alternatively, when indicating the first time-frequency resource subunit within the time interval, the configuration information may indicate an index of a start basic frequency domain unit on a frequency domain resource of the first time-frequency resource subunit within the time interval and an index of an end basic frequency domain unit on the frequency domain resource of the first time-frequency resource subunit within the time interval. In this way, all basic frequency domain units between the start basic frequency domain unit and the end basic frequency domain unit form the frequency domain resource. It should be noted that when the first time-frequency resource subunit is indicated, if only the frequency domain resource is indicated but the time domain resource is not indicated, a time domain of the first time-frequency resource subunit may occupy an entire time domain resource.

According to any one of the first aspect to the fourth feasible implementation of the first aspect, in a seventh feasible implementation of the first aspect, when the configuration information indicates the at least one time-frequency resource unit within the time interval, one basic time domain unit and basic frequency domain unit may include one resource element or one resource block. When indicating the second time-frequency resource subunit within the time interval, the configuration information may indicate the index of the start basic time domain unit on the time domain resource of the second time-frequency resource unit within the time interval and the total quantity of basic time domain units included in the time domain resource of the second time-frequency resource subunit within the time interval. Alternatively, when indicating the time domain resource of the second time-frequency resource subunit within the time interval, the configuration information may indicate the index of the start basic time domain unit on the time domain resource of the second time-frequency resource subunit and the index of the end basic time domain unit on the time domain resource of the second time-frequency resource subunit. In this way, all basic time domain units between the start basic time domain unit and the end basic time domain unit form the time domain resource of the second time-frequency resource subunit. It should be noted that when the second time-frequency resource subunit is indicated, if only the time domain resource is indicated but a frequency domain resource is not indicated, a frequency domain of the second time-frequency resource subunit may occupy entire frequency domain bandwidth.

According to any one of the first aspect to the fourth feasible implementation of the first aspect, in an eighth feasible implementation of the first aspect, when indicating a frequency domain resource of the second time-frequency resource subunit within the time interval, the configuration information may indicate an index of a start basic frequency domain unit on the frequency domain resource of the second time-frequency resource subunit within the time interval and a total quantity of basic frequency domain units included in the frequency domain resource of the second time-frequency resource subunit within the time interval. Alternatively, when indicating a frequency domain resource of the second time-frequency resource subunit within the time interval, the configuration information may indicate an index of a start basic frequency domain unit on the frequency domain resource of the second time-frequency resource subunit within the time interval and an index of an end basic frequency domain unit on the frequency domain resource of the second time-frequency resource subunit within the time interval. In this way, all basic frequency domain units between the start basic frequency domain unit and the end basic frequency domain unit form the frequency domain resource of the second time-frequency resource subunit. It should be noted that when the second time-frequency resource subunit is indicated, if only the frequency domain resource is indicated but the time domain resource is not indicated, a time domain of the second time-frequency resource subunit may occupy an entire time domain resource.

According to any one of the first aspect to the fourth feasible implementation of the first aspect, in a ninth feasible implementation of the first aspect, when indicating the first time-frequency resource subunit and/or the second time-frequency resource subunit within the time interval, the configuration information may indicate at least one preset format identifier that is corresponding to the first time-frequency resource subunit and/or the second time-frequency resource subunit and that is included in the configuration information. One time domain resource subunit is corresponding to one preset format identifier.

According to the first aspect, in a tenth feasible implementation of the first aspect, the configuration information may be carried in dynamic signaling or semi-static signaling; and if the user equipment receives the dynamic signaling and the semi-static signaling, the user equipment selects the dynamic signaling or the semi-static signaling based on a preset priority, and obtains the configuration information from the selected signaling.

A second aspect of the present invention provides a resource configuration method, including:

sending, by a network device, configuration information to all user equipments in a cell of the network device, where the configuration information is used to indicate at least one time interval and at least one time domain resource unit within the time interval, and the time domain resource unit includes a first time-frequency resource subunit and/or a second time-frequency resource subunit. After receiving the configuration information, the user equipment reconfigures a resource mapping manner and/or a rate matching manner based on the configuration information, so that no downlink receiving or uplink sending is performed by the user equipment on the first time-frequency resource subunit, and adjusts a timing offset of the second time-frequency resource subunit to align the second time-frequency resource subunit with a time-frequency resource subunit of the network device, so as to perform downlink receiving or uplink sending on the second time-frequency resource subunit obtained by adjusting the timing offset, thereby ensuring that the user equipment correctly transmits and receives data.

According to the second aspect, in a first feasible implementation of the second aspect, preferably, the configuration information may be dynamic signaling or semi-static signaling in a specific format. The specific format may be a specific field, or may be a different field format or length, or the like. When detecting the specific format, the user equipment reconfigures the resource mapping manner and/or the rate matching manner based on the configuration information, so that no downlink receiving or uplink sending is performed by the user equipment on the first time-frequency resource subunit, and adjusts the timing offset of the second time-frequency resource subunit to perform downlink receiving or uplink sending on the second time-frequency resource subunit obtained by adjusting the timing offset.

According to the second aspect or the second feasible implementation of the second aspect, in a third feasible implementation of the second aspect, a measurement signal is transmitted between the network device and another network device.

A third aspect of the present invention provides a resource configuration method, including:

receiving, by user equipment, configuration information sent by a network device, where the configuration information is used to indicate at least one time interval and at least one time-frequency resource subunit within the time interval; and reconfiguring, by the user equipment onto a predefined time-frequency resource based on the configuration information, a signal on the time-frequency resource subunit indicated by the configuration information, and skipping performing downlink receiving or uplink sending on the time-frequency resource subunit. In this manner, the indicated time-frequency resource subunit may be punctured through resource reconfiguration, to facilitate utilization of the time-frequency resource subunit.

According to the third aspect, in a first feasible implementation of the third aspect, the signal on the time-frequency resource subunit includes at least one of data information, a control signal, and a reference signal.

According to the first feasible implementation of the third aspect, in a second feasible implementation of the first aspect, the predefined time-frequency resource is a basic time domain unit that includes a preset index (for example, the predefined time-frequency resource is a basic time domain unit that includes an index of 2, or the predefined time-frequency resource is two basic time domain units that include indices of 2 and 3); or the predefined time-frequency resource is a time-frequency resource that differs by a preset quantity of basic time domain units from the time-frequency resource subunit in time domain; or the predefined time-frequency resource is a time-frequency resource that differs by a first preset quantity of basic time domain units from the time-frequency resource subunit in time domain and that differs by a second preset quantity of basic frequency domain units from the time-frequency resource subunit in frequency domain.

According to any one of the third aspect to the second feasible implementation of the third aspect, in a third feasible implementation of the third aspect, the time-frequency resource subunit indicated by the configuration information may be used to transmit a measurement signal between the user equipment and user equipment in a cell adjacent to a cell to which the user equipment belongs; or the time-frequency resource subunit is used to transmit a measurement signal between the network device and another network device, and the user equipment does not transmit and receive data on the time-frequency resource subunit.

A fourth aspect of the present invention provides a resource configuration method, including:

sending, by a network device, configuration information to user equipment, where the configuration information is used to indicate at least one time interval and at least one time-frequency resource subunit within the time interval; and after receiving the configuration information, reconfiguring, by the user equipment, a signal on the time-frequency resource subunit onto a predefined time-frequency resource.

According to the fourth aspect, in a first feasible implementation of the fourth aspect, the time-frequency resource subunit is used to transmit a measurement signal between the network device and another network device; or the time-frequency resource subunit is used to transmit a measurement signal between the user equipment and user equipment in a cell adjacent to a cell to which the user equipment belongs.

A fifth aspect of the present invention provides a resource configuration apparatus, applied to user equipment and including a function module required to implement the method according to the first aspect. Details of division and description of a specific function module are not described herein.

A sixth aspect of the present invention provides a resource configuration apparatus, applied to a network device and including a function module required to implement the method according to the second aspect. Details of division and description of a specific function module are not described herein.

A seventh aspect of the present invention provides a resource configuration apparatus, applied to user equipment and including a function module required to implement the method according to the third aspect. Details of division and description of a specific function module are not described herein.

An eighth aspect of the present invention provides a resource configuration apparatus, applied to a network device and including a function module required to implement the method according to the fourth aspect. Details of division and description of a specific function module are not described herein.

An embodiment of the present invention provides user equipment, including a transceiver, a processor, and a memory. The user equipment is a specific structure that carries a function module in the fifth aspect.

The memory is configured to store a computer program instruction.

The processor is coupled to the memory, and is configured to: read the computer program instruction stored in the memory, and perform the method according to the first aspect.

For a procedure executed by the processor, refer to the foregoing channel state feedback procedure. Details are not described herein again.

An embodiment of the present invention provides a network device, including a transceiver, a processor, and a memory. The network device is a specific structure that carries a function module in the sixth aspect.

The memory is configured to store a computer program instruction.

The processor is coupled to the memory, and is configured to: read the computer program instruction stored in the memory, and perform the method according to the second aspect.

For a procedure executed by the processor, refer to the foregoing channel state feedback procedure. Details are not described herein again.

An embodiment of the present invention provides user equipment, including a transceiver, a processor, and a memory. The user equipment is a specific structure that carries a function module in the seventh aspect.

The memory is configured to store a computer program instruction.

The processor is coupled to the memory, and is configured to: read the computer program instruction stored in the memory, and perform the method according to the third aspect.

For a procedure executed by the processor, refer to the foregoing channel state feedback procedure. Details are not described herein again.

An embodiment of the present invention provides a network device, including a transceiver, a processor, and a memory. The network device is a specific structure that carries a function module in the eighth aspect.

The memory is configured to store a computer program instruction.

The processor is coupled to the memory, and is configured to: read the computer program instruction stored in the memory, and perform the method according to the fourth aspect.

For a procedure executed by the processor, refer to the foregoing channel state feedback procedure. Details are not described herein again.

An embodiment of the present invention provides a resource configuration apparatus, and the resource configuration apparatus may be configured to perform the method according to the first aspect, the second aspect, the third aspect, or the fourth aspect.

An embodiment of the present invention provides a computer readable storage medium, including a computer program. When the computer program runs on a computer, the method according to the first aspect, the second aspect, the third aspect, or the fourth aspect is performed.

The network device provided in this application has a function of implementing behavior of the network device in the foregoing method aspect, and includes a corresponding means (means) configured to perform the steps or functions described in the foregoing method aspect. The steps or functions may be implemented by using software, hardware, or a combination of hardware and software.

In a possible design, the network device includes one or more processors and a communications unit. The one or more processors are configured to support the network device in implementing a corresponding function in the foregoing method, for example, generate configuration information. The transceiver unit is configured to support the network device in communicating with another device, so as to implement a receiving and/or sending function, for example, send the configuration information generated by the processor.

Optionally, the network device may further include one or more memories. The memory is configured to be coupled to the processor, and store a program instruction and data that are necessary for the network device. The one or more memories may be integrated with the processor, or may be separated from the processor. This is not limited in this application.

The network device may be a base station, a TRP, or the like, and the communications unit may be a transceiver or a transceiver circuit.

The network device may alternatively be a communications chip. The communications unit may be an input/output circuit or interface of the communications chip.

In another possible design, the network device includes a transceiver, a processor, and a memory. The processor is configured to control the transceiver to transmit and receive a signal, the memory is configured to store a computer program, and the processor is configured to invoke the computer program from the memory and run the computer program, so that the network device performs the method completed by the network device in any one of the second aspect and the possible implementations of the second aspect or any one of the fourth aspect and the possible implementations of the fourth aspect.

This application further provides an apparatus, and the apparatus has a function of implementing behavior of the user equipment in the foregoing method aspect, and includes a corresponding means (means) configured to perform the steps or functions described in the foregoing method aspect. The steps or functions may be implemented by using software, hardware, or a combination of hardware and software.

In a possible design, the apparatus includes one or more processors and a communications unit. The one or more processors are configured to support the apparatus in implementing a corresponding function in the foregoing method, for example, parse configuration information. The transceiver unit is configured to support the apparatus in communicating with another device, so as to implement a receiving and/or sending function, for example, receive the configuration information.

Optionally, the apparatus may further include one or more memories. The memory is configured to be coupled to the processor, and store a program instruction and data that are necessary for the apparatus. The one or more memories may be integrated with the processor, or may be separated from the processor. This is not limited in this application.

The apparatus may be an intelligent terminal, a wearable device, or the like, and the communications unit may be a transceiver or a transceiver circuit.

The apparatus may alternatively be a communications chip. The communications unit may be an input/output circuit or interface of the communications chip.

In another possible design, the apparatus includes a transceiver, a processor, and a memory. The processor is configured to control the transceiver to transmit and receive a signal, the memory is configured to store a computer program, and the processor is configured to invoke the computer program from the memory and run the computer program, so that the apparatus performs the method completed by the user equipment in any one of the first aspect and the possible implementations of the first aspect or any one of the third aspect and the possible implementations of the third aspect.

In the embodiments of the present invention, the user equipment receives the configuration information sent by the network device, where the configuration information indicates the at least one time interval and the at least one time-frequency resource unit within the time interval, and the time-frequency resource unit includes the first time-frequency resource subunit and/or the second time-frequency resource subunit. The user equipment reconfigures the resource mapping manner and/or the rate matching manner based on the configuration information, so that no downlink receiving or uplink sending is performed by the user equipment on the first time-frequency resource subunit, and adjusts the timing offset of the second time-frequency resource subunit to perform downlink receiving or uplink sending on the second time-frequency resource subunit obtained by adjusting the timing offset. This manner can ensure that data is accurately transmitted and received between the user equipment and the network device.

BRIEF DESCRIPTION OF DRAWINGS

To describe the technical solutions in the embodiments of the present invention or in the background more clearly, the following briefly describes the accompanying drawings required for describing the embodiments of the present invention or the background.

DESCRIPTION OF EMBODIMENTS

The following describes the embodiments of the present invention with reference to the accompanying drawings in the embodiments of the present invention.

A time-frequency resource subunit in the embodiments of the present invention is a time-frequency resource that includes at least one basic time domain unit and at least one basic frequency domain unit. The basic time domain unit may be a time domain symbol, and the basic frequency domain unit may be a subcarrier.

An index of a basic time domain unit in the embodiments of the present invention is as follows: All basic time domain units on a time domain resource are sorted and numbered in chronological order (by using Arabic numerals). In this case, the number is the index of the basic time domain unit.

An index of a basic frequency domain unit in the embodiments of the present invention is as follows: All basic frequency domain units on a frequency domain resource are sorted and numbered based on a frequency magnitude (by using Arabic numerals). In this case, the number is the index of the basic frequency domain unit.

A resource configuration method in the embodiments of the present invention may be applied to a new radio (New Radio, NR) resource configuration of 5th generation (the 5th Generation, 5G) mobile communication.

A measurement signal in the embodiments of the present invention may be a measurement reference signal, namely, an MRS signal used for interference measurement and/or channel sounding between network devices in neighboring cells, or a measurement signal may be a measurement reference signal, namely, an MRS signal used for interference measurement and/or channel sounding between user equipments in neighboring cells.

A network device in the embodiments of the present invention is mainly responsible for functions on an air interface side such as radio resource management, quality of service (QoS, Quality of Service) management, and data compression and encryption, for example, a network device (a base station) in an LTE system. User equipment in the embodiments of the present invention is a device that accesses a network side by using a network device, for example, a handheld terminal or a notebook computer.

A time interval in the embodiments of the present invention is a time unit in a time division multiplexing system, for example, a subframe in the LTE system, and a length of one subframe in the LTE system is 1 ms.

Figure 1:
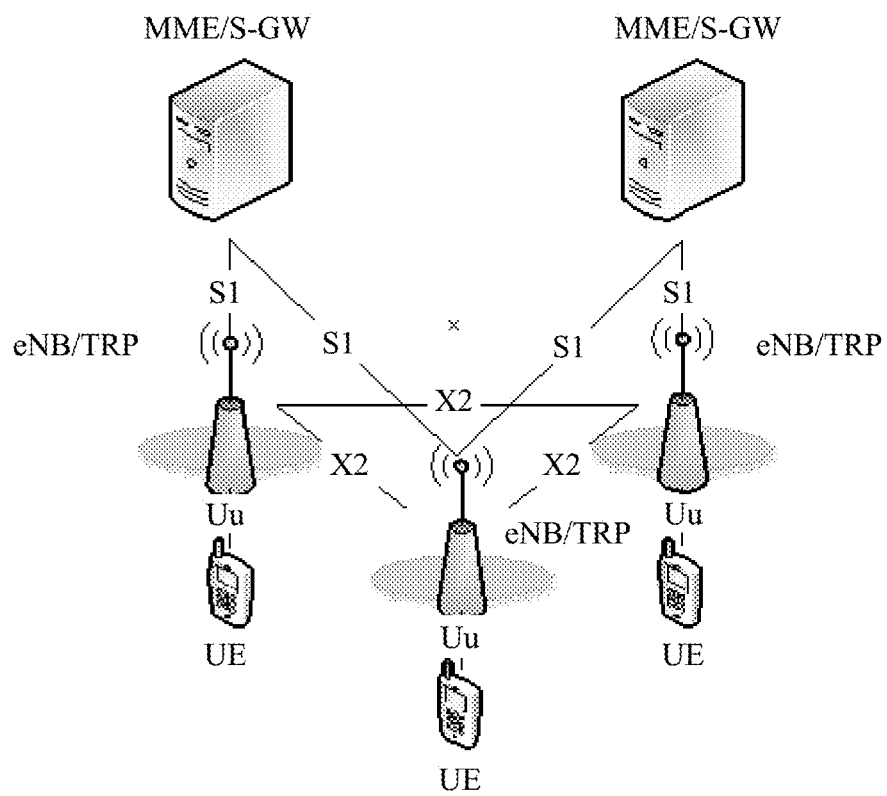
FIG. 1 is a schematic diagram of an LTE/NR system architecture according to an embodiment of the present invention.

FIG. 1 shows a system architecture of an LTE system and a 5G system according to an embodiment of the present invention. Each network element and interface are described as follows:

Mobility management entity (MME, Mobility Management Entity)/serving gateway (S-GW, Serving GateWay): The MME is a key control node in 3rd Generation Partnership Project (3GPP, 3rd Generation Partnership Project) LTE, belongs to a core network element, and is mainly responsible for a signaling processing part, namely, a control plane function, including functions such as access control, mobility management, attachment and detachment, a session management function, and gateway selection. The S-GW is an important network element in a core network in 3GPP LTE, and is mainly responsible for a user plane function of forwarding user data, namely, routing and forwarding a packet under control of the MME. Evolved NodeB (Evolved NodeB, eNB)/transmission/reception node (transmission/reception point, TRP): The eNB is a network device in an LTE system. The TRP is a network device in a 5G system, and is mainly responsible for functions on an air interface side such as radio resource management, quality of service (QoS, Quality of Service) management, and data compression and encryption. On a core network side, the eNB is mainly responsible for forwarding control plane signaling to the MME and forwarding user plane service data to the S-GW.

UE: The UE is a device that accesses a network side by using an eNB in LTE. For example, the UE may be a handheld terminal, a notebook computer, or another device that can access a network.

S1 interface: a standard interface between an eNB and a core network. The eNB is connected to the MME by using an S1-MME interface, and is configured to control signaling transmission. The eNB is connected to the S-GW by using an S1-U interface, and is configured to transmit user data. The S1-MME interface and the S1-U interface are collectively referred to as the S1 interface.

X2 interface: a standard interface between eNBs, configured to implement interworking between network devices.

Uu interface: The Uu interface is a wireless interface between UE and a network device. The UE accesses an LTE network by using the Uu interface.

With development of wireless network technologies, services that emerge in endlessly have an increasing requirement for a radio resource. To adapt to a quick change in a downlink DL/UL service feature in a small coverage network, a dynamic time division duplex (Dynamic Time Division Duplex, D-TDD) technology attracts increasing attention. The D-TDD indicates that a TDD uplink-downlink subframe configuration is flexibly and quickly switched based on an uplink-downlink service load status in a network, to meet a specific service requirement of the network, thereby improving a throughput of a DL/UL service in the network.

Figure 2:
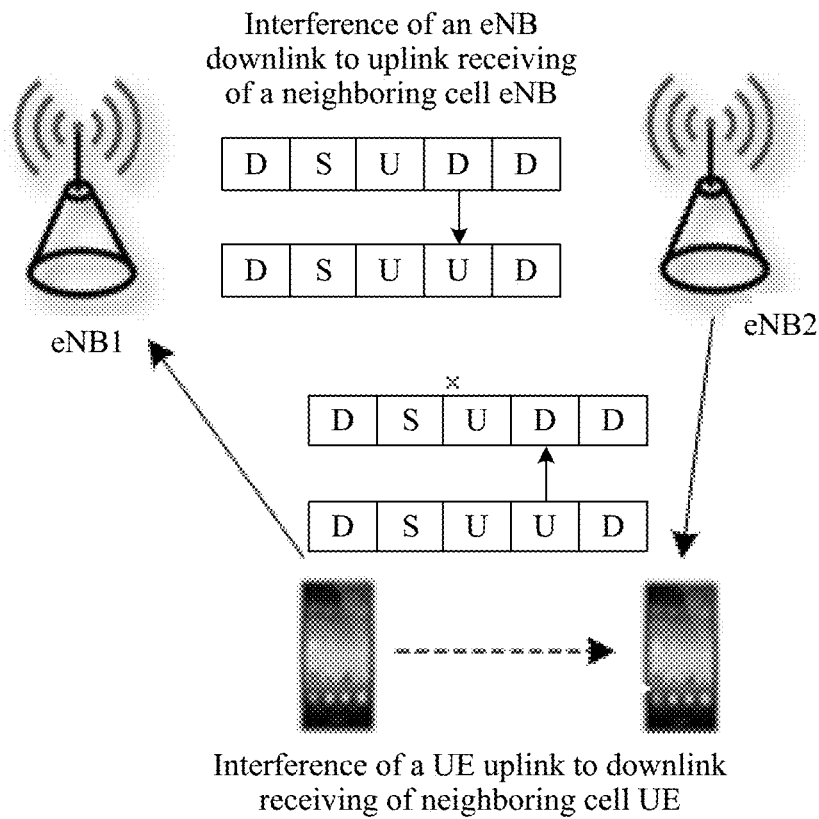
FIG. 2 is a schematic diagram of D-TDD inter-cell cross interference according to an embodiment of the present invention.

To better obtain performance advantages of flexibility and efficiency of the D-TDD technology and effectively improve a D-TDD performance gain, a series of measurement reference signals (MRS, Measurement Reference Signal) used for interference measurement/channel sounding often need to be sent or received between eNBs or user equipments. For example, to eliminate inter-cell cross interference shown in FIG. 2 by using technologies such as interference identification, interference suppression, and interference coordination (cross interference exists between network devices in neighboring cells. As shown in the figure, downlink subframe data transmission of one eNB causes interference to uplink subframe data transmission of a neighboring cell eNB. In addition, cross interference exists between user equipments in neighboring cells. As shown in the figure, uplink subframe data transmission of one UE causes interference to downlink subframe data transmission of a neighboring cell eNB), an interference measurement reference signal (IMRS, Interference Measurement Reference Signal) needs to be sent or received between the eNBs or the UEs.

However, regardless of whether the MRSs are sent or received between the eNBs or the UEs, behavior of UE that accesses a link in a current subframe is affected. For example, if an eNB receives an MRS, the eNB cannot implement downlink sending for UE; or if an eNB receives an MRS, the eNB cannot implement uplink receiving from UE. Therefore, a current-subframe configuration method is necessarily studied.

To reduce impact caused by MRS measurement between eNBs/UEs on cell UE on the premise that accuracy of the MRS measurement between the eNBs/UEs is ensured, an effective method is to configure an MBSFN subframe to send/receive an MRS.

Figure 3:
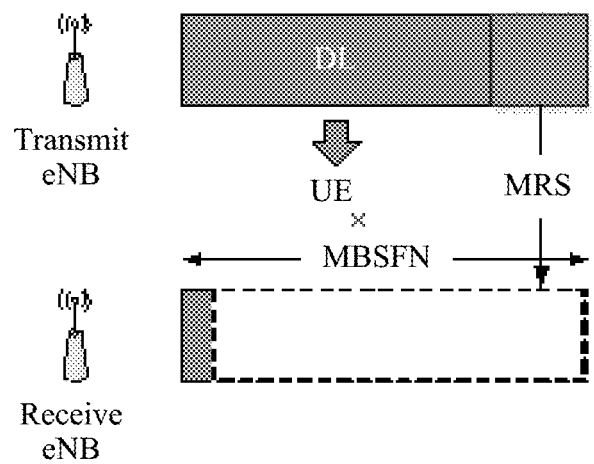
FIG. 3 is a schematic diagram of an MRS measurement subframe resource configuration in the prior art according to an embodiment of the present invention.

The measurement between the eNBs is still used as an example. As shown in FIG. 3, when an eNB needs to receive, in a corresponding subframe, an MRS sent by a neighboring cell eNB, the eNB instructs UE that belongs to the eNB to configure the subframe as an MBSFN subframe. Likewise, when an eNB needs to send an MRS in a corresponding subframe, the eNB instructs UE that belongs to the eNB to configure the subframe as an MBSFN subframe.

An MBSFN subframe is configured for UE in a cell for measurement between eNBs. Consequently, the UE in the cell cannot perform uplink sending or downlink receiving in the subframe. Actually, in some specific cases, when large-scale interference intensity measurement is performed between the eNBs, a very small quantity of MRSs are required. Using resources of an entire subframe for MRS measurement causes a great waste of resources. In addition, MRS measurement between UEs cannot be implemented by using an MBSFN subframe configuration method, and in many cases, the UE may receive an MRS for measurement.

According to the resource configuration method provided in the embodiments of the present invention, a network device sends, to at least one user equipment (all user equipments or specific user equipment in a cell of the network device), configuration information used to indicate at least one time interval and at least one time-frequency resource unit within the time interval. The user equipment reconfigures a resource mapping manner and/or a rate matching manner based on the configuration information, so that no downlink receiving or uplink sending is performed by the user equipment on a first time-frequency resource subunit, and adjusts a timing offset of a second time-frequency resource subunit to perform downlink receiving or uplink sending on the second time-frequency resource subunit obtained by adjusting the timing offset.

If the network device sends the configuration information to all the user equipments of the network device, the second time-frequency resource subunit obtained by adjusting the timing offset may be used to transmit a measurement signal between the network device and another network device. The user equipment may identify a measurement signal transmitted and received between network devices; therefore, the user equipment may receive the measurement signal by using the second time-frequency resource subunit obtained by adjusting the timing offset, thereby ensuring correct reception of data. Alternatively, the user equipment may send uplink data to the network device, and the network device can distinguish between the measurement signal and the uplink data.

If the network device sends the configuration information to the specific user equipment of the network device, the second time-frequency resource subunit obtained by adjusting the timing offset may be used to transmit a measurement signal between the user equipment and user equipment in a cell adjacent to a cell to which the user equipment belongs.

Figure 4:
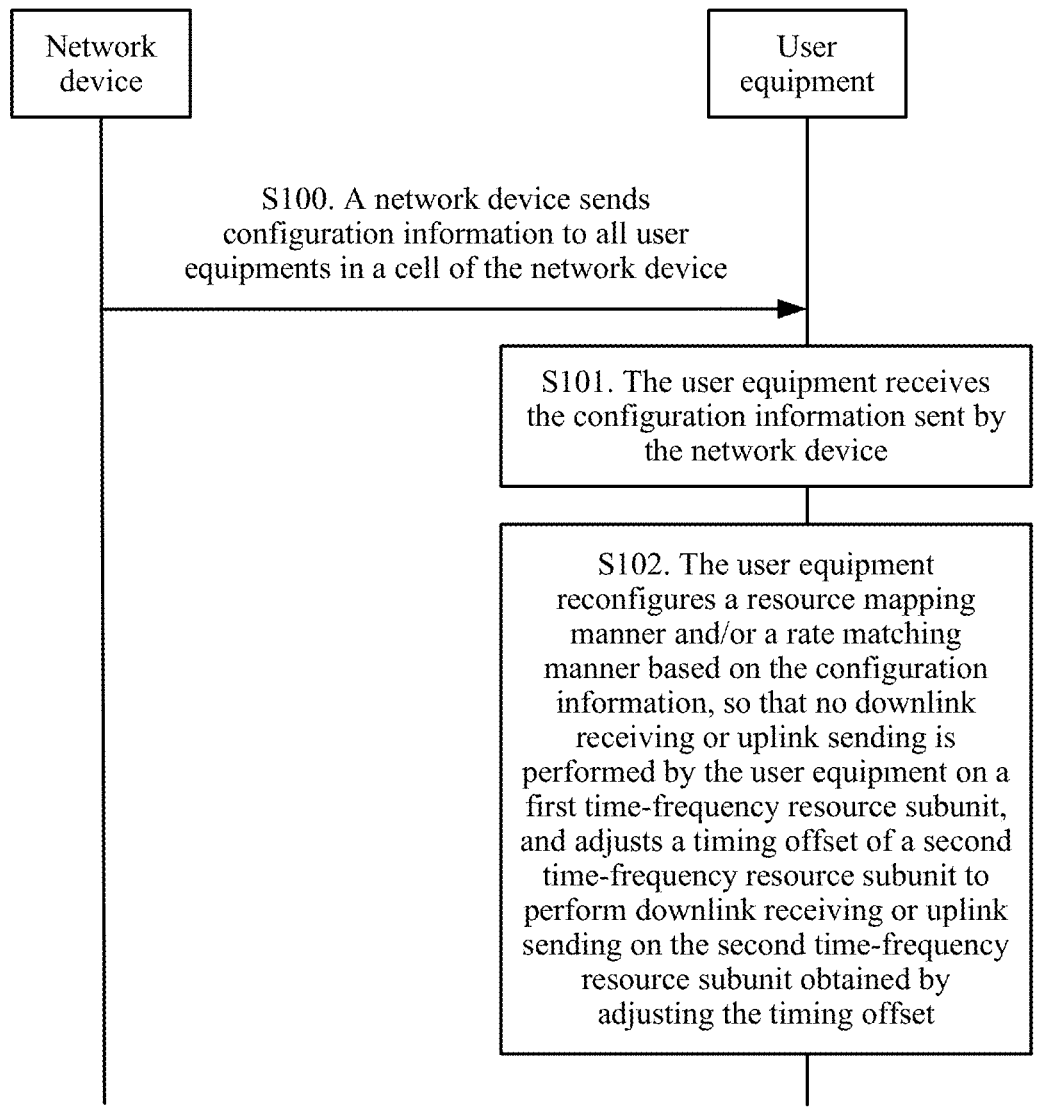
FIG. 4 is a schematic flowchart of a resource configuration method according to an embodiment of the present invention.

FIG. 4 shows a method for implementing resource configuration through air interface information interaction between a network device and user equipment in a 5G network according to an embodiment of the present invention. As shown in FIG. 4, the method includes the following steps.

S100. The network device sends configuration information to all user equipments in a cell of the network device, where the configuration information is used to indicate at least one time interval and at least one time-frequency resource unit within the time interval, and the time-frequency resource unit includes a first time-frequency resource subunit and/or a second time-frequency resource subunit.

In this embodiment of the present invention, the network device is mainly responsible for radio resource management on an air interface side, and is configured to schedule a radio resource, for example, an eNB in an LTE system or a TRP in a 5G system. The time interval may be a subframe in the LTE system. The configuration information is used to indicate the at least one time domain resource unit within the at least one time interval, and the time domain resource unit may include the first time-frequency resource subunit and/or the second time-frequency resource subunit. The network device indicates either of the first time-frequency resource subunit and the second time-frequency resource subunit by using the configuration information, and the user equipment may automatically obtain the other time-frequency resource subunit based on a preset definition. It may be understood that the network device may alternatively indicate both time-frequency resource subunits to the user equipment.

One time-frequency resource subunit may include at least one basic time domain unit and at least one basic frequency domain unit. For example, one time-frequency resource subunit may include a specified symbol in the LTE system in time domain and a subcarrier or a resource block pair (Resource Block pair, RB pair) in the LTE system in frequency domain, or one time-frequency resource subunit may include a resource element (Resource Element, RE) or a resource block (Resource Block, RB) in the LTE system. Specifically, optionally, a relationship between the first time-frequency resource subunit and the second time-frequency resource subunit is described by using a neighboring relationship on a time domain resource. The first time-frequency resource subunit is located on a time domain resource on which an index of a start basic time domain unit is M and an index of an end basic time domain unit is N, and one basic time domain unit is corresponding to one index (for example, one symbol is corresponding to one index in the LTE system, sorting is performed based on a time relationship of all symbols, and the index is a sorting order value). The second time domain resource subunit is located on a time domain resource on which an index of an end basic time domain unit is M−1 and an index of a start basic time domain unit is M−A (in other words, the second time-frequency resource subunit is before the first time-frequency resource subunit and is adjacent to the first time-frequency resource subunit). Alternatively, the second time domain resource subunit is located on a time domain resource on which an index of a start basic time domain unit is N+1 and an index of an end basic time domain unit is N+A (in other words, the second time-frequency resource subunit is after the first time-frequency resource subunit and is adjacent to the first time-frequency resource subunit). It should be noted that if M=N, the first time-frequency resource subunit includes only one symbol in time domain.

The configuration information indicates a measurement period of signal measurement, in other words, indicates the at least one time interval to the user equipment. For example, the network device performs one time of signal measurement every 10 time intervals or indicates an identifier of the at least one time interval.

Optionally, the configuration information may be dynamic signaling or semi-static signaling in a specific format. The specific format may be a field in a specific length, a field with a specific meaning, or the like. When detecting the specific format, the user equipment may reconfigure a resource mapping manner and/or a rate matching manner based on the configuration information, so that no downlink receiving or uplink sending is performed by the user equipment on the first time-frequency resource subunit, and adjust a timing offset of the second time-frequency resource subunit to perform downlink receiving or uplink sending on the second time-frequency resource subunit obtained by adjusting the timing offset.

Optionally, an indication manner in which the network device indicates the at least one time interval and the at least one time-frequency resource unit within the time interval may be as follows: The network device sends first configuration information to the user equipment, where the first configuration information is used to indicate the at least one time interval; and the network device sends second configuration information to the user equipment, where the second configuration information is used to indicate the at least one time-frequency resource unit within the time interval.

Further, optionally, one time-frequency resource subunit may include at least one basic time domain unit and at least one basic frequency domain unit. One basic time domain unit may be a time domain symbol, and one basic frequency domain unit may be one subcarrier.

In an optional implementation, when the configuration information is used to indicate the first time-frequency resource subunit and/or the second time-frequency resource subunit within the time interval, only a time domain of the time-frequency resource subunit may be indicated, and in this case, a frequency domain of the time-frequency resource subunit is considered as entire frequency domain bandwidth by default, or only a frequency domain may be indicated, and in this case, a time domain of the time-frequency resource subunit is considered as an entire time domain by default.

Herein, a time domain indication of either of the time-frequency resource subunits is used as an example for description. An index of a start basic time domain unit on a time domain resource of the time-frequency resource subunit and a total quantity of basic time domain units included in the time domain resource of the time-frequency resource subunit may be indicated. Alternatively, an index of a start basic time domain unit on a time domain resource of the time-frequency resource subunit and an index of an end basic time domain unit on the time domain resource of the time-frequency resource subunit may be indicated.

Herein, a frequency domain indication of either of the time-frequency resource subunits is used as an example for description. An index of a start basic frequency domain unit on a frequency domain resource of the time-frequency resource subunit and a total quantity of basic frequency domain units included in the frequency domain resource of the time-frequency resource subunit may be indicated. Alternatively, an index of a start basic frequency domain unit on a frequency domain resource of the time-frequency resource subunit and an index of an end basic time domain unit on the frequency domain resource of the time-frequency resource subunit may be indicated.

Figure 6A:
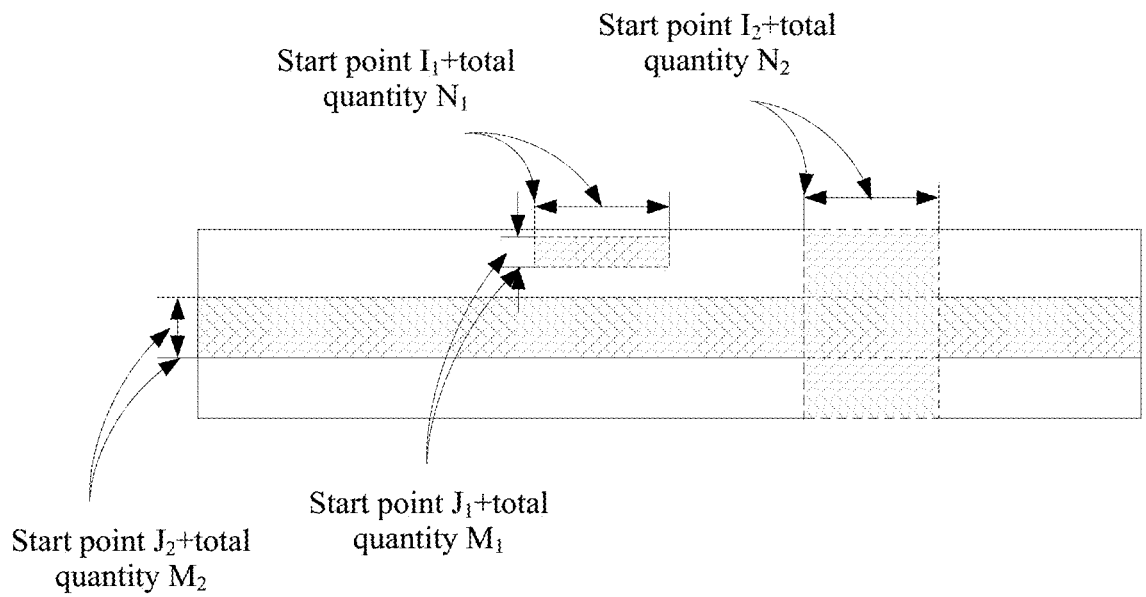
FIG. 6a is a schematic diagram of a resource indication method according to an embodiment of the present invention.

FIG. 6a is a schematic diagram of indicating a time domain resource and a frequency domain resource of a time-frequency resource subunit within a time interval. The time domain resource may be indicated by using an index I1 of a start basic time domain unit and a total quantity N1 of basic time domain units included in the time domain resource of the time-frequency resource subunit. In addition, an index J1 of a start basic frequency domain unit on the frequency domain resource of the time-frequency resource subunit and a total quantity M1 of basic frequency domain units included in the frequency domain resource of the time-frequency resource subunit may be indicated. It should be noted that if only the index of the start basic time domain unit on the time domain resource and the total quantity of the basic time domain units included in the time domain resource are indicated, it indicates that an indicated resource block occupies an entire frequency domain resource. If only the index of the start basic frequency domain unit on the frequency domain resource and the total quantity of the basic frequency domain units included in the frequency domain resource are indicated, it indicates that an indicated resource block occupies an entire time domain resource. As shown in FIG. 6a, if only an index I2 of a start basic time domain unit on the time domain resource and a total quantity N2 of basic time domain units included in the time domain resource are indicated, an indicated resource block occupies an entire frequency domain. If only an index J2 of a start basic frequency domain unit on the frequency domain resource and a total quantity M2 of basic frequency domain units included in the frequency domain resource are indicated, an indicated resource block occupies an entire time domain resource.

Figure 6B:
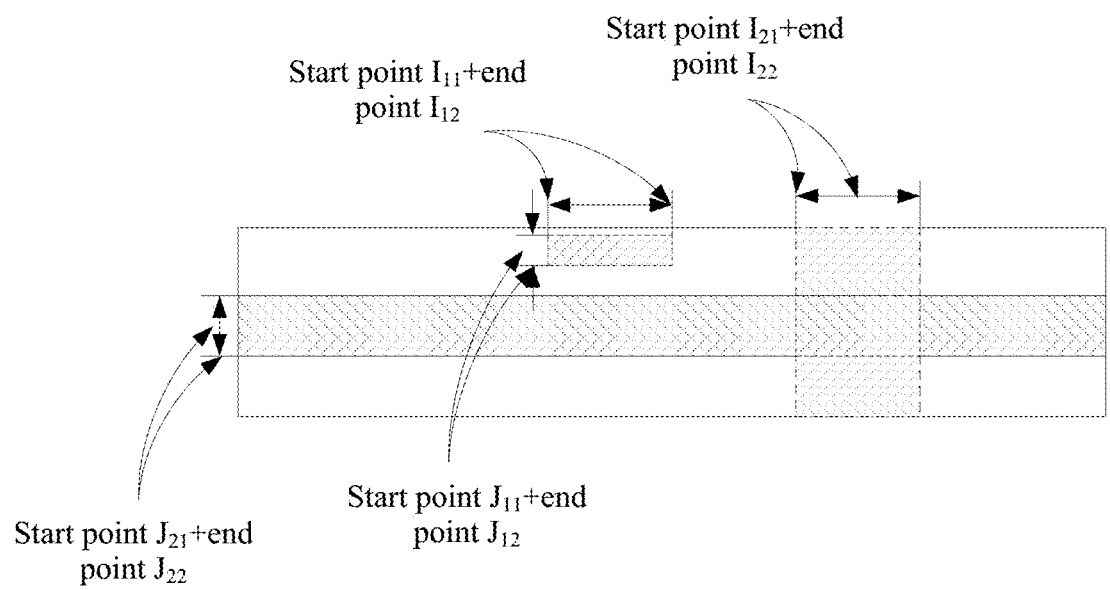
FIG. 6b is a schematic diagram of another resource indication method according to an embodiment of the present invention.

FIG. 6b is a schematic diagram of indicating a time domain resource and a frequency domain resource of a time-frequency resource subunit within a time interval. The time domain resource may be indicated by using an index I11 of a start basic time domain unit and an index I12 of an end basic time domain unit on the time domain resource. In addition, an index J11 of a start basic frequency domain unit on the frequency domain resource of the time-frequency resource subunit and an index J12 of an end basic frequency domain unit on the frequency domain resource of the time-frequency resource subunit may be indicated. It should be noted that if only the index of the start basic time domain unit on the time domain resource and the index of the end basic time domain unit on the time domain resource are indicated, it indicates that an indicated resource block occupies an entire frequency domain resource. If only the index of the start basic frequency domain unit on the frequency domain resource and the index of the end basic frequency domain unit on the frequency domain resource are indicated, it indicates that an indicated resource block occupies an entire time domain resource. As shown in FIG. 6b, if only an index I21 of a start basic time domain unit on the time domain resource and an index I22 of an end basic time domain unit on the time domain resource are indicated, an indicated resource block occupies an entire frequency domain. If only an index J21 of a start basic frequency domain unit on the frequency domain resource and an index J22 of an end basic frequency domain unit on the frequency domain resource are indicated, an indicated resource block occupies an entire time domain resource.

In another optional implementation, a system predefines preset format identifiers corresponding to various possible time-frequency resource subunits. It should be noted that the time-frequency resource subunits are in a one-to-one correspondence with the preset format identifiers. For example, a time-frequency resource subunit that includes only basic time domain units whose indices are 1, 2, and 3 on the time domain resource is corresponding to a preset format identifier 1, a time-frequency resource subunit that includes only basic frequency domain units whose indices are 1, 2, and 3 on the frequency domain resource is corresponding to a preset format identifier 2, and a time-frequency resource subunit that simultaneously includes the basic time domain units whose indices are 1, 2, and 3 on the time domain resource and the basic frequency domain units whose indices are 1, 2, and 3 on the frequency domain resource is corresponding to a preset format identifier 3. In this case, if the network device needs to simultaneously indicate the basic time domain units whose indexes are 1, 2, and 3 on the time domain resource and the basic frequency domain units whose indexes are 1, 2, and 3 on the frequency domain resource, the network device sends the preset format identifier 3 to the user equipment by using the configuration information, thereby reducing overheads.

The network device sends the configuration information to the user equipment, and the user equipment receives the configuration information. Optionally, the configuration information may be carried in dynamic signaling or semi-static signaling. The dynamic signaling is signaling carried in a control channel, and the semi-static signaling may be signaling carried in a broadcast channel, or data carried in a radio resource control (Radio Resource Control, RRC) channel. Further, optionally, if the network device sends both the dynamic signaling and the semi-static signaling, the user equipment may select the dynamic signaling or the semi-static signaling based on a preset priority, and reconfigure a resource mapping manner and/or a rate matching manner based on the configuration information carried in the selected signaling.

It should be noted that if the network device sends configuration information to all user equipments in a cell of the network device, the configuration information is cell-specific configuration information, and the configuration method may be applied to a scenario in which a measurement signal is transmitted between the network device and another network device. For example, a network device needs to transmit a measurement signal with another network device on a second time-frequency resource subunit. Due to a design manner of the measurement signal, the user equipment may receive the measurement signal, or the network device that receives the measurement signal may obtain the measurement signal from a mixed signal through parsing. In this case, the user equipment may be allowed to perform downlink receiving or uplink sending on the time-frequency resource subunit. However, because basic time domain units are usually not aligned, no uplink sending or downlink receiving is allowed on a corresponding first time domain resource subunit, and a timing offset is adjusted in time domain to align time domain resources, thereby ensuring that data is correctly transmitted and received. Therefore, in this embodiment of the present invention, the second time-frequency resource subunit obtained by adjusting the timing offset may be used to transmit the measurement signal between the network devices.

If the network device sends configuration information to specific user equipment in a cell of the network device, in other words, the configuration information includes an identifier of the specific user equipment, only the specific user equipment reconfigures a resource mapping manner and/or a rate matching manner, so that the user equipment does not perform uplink sending or downlink receiving on the first time-frequency resource, and adjusts a timing offset of the second time-frequency resource to align time domains between the user equipment and user equipment in a cell adjacent to the cell to which the user equipment belongs, so as to transmit a measurement signal on the second time-frequency resource subunit obtained by adjusting the timing offset.

S101. The user equipment receives the configuration information sent by the network device, where the configuration information is used to indicate the at least one time interval and the at least one time-frequency resource unit within the time interval, and the time-frequency resource unit includes the first time-frequency resource subunit and/or the second time-frequency resource subunit.

S102. The user equipment reconfigures a resource mapping manner and/or a rate matching manner based on the configuration information, so that no downlink receiving or uplink sending is performed by the user equipment on the first time-frequency resource subunit, and adjusts a timing offset of the second time-frequency resource subunit to perform downlink receiving or uplink sending on the second time-frequency resource subunit obtained by adjusting the timing offset.

In this embodiment of the present invention, the user equipment reconfigures the resource mapping manner and/or the rate matching manner based on the at least one time interval and the first time-frequency resource subunit and/or the second time-frequency resource subunit within the time interval that are indicated by the network device. It should be noted that the network device herein may indicate either or both of the first time-frequency resource subunit and the second time-frequency resource subunit. When the network device indicates only one of the time-frequency resource subunits, the user equipment may automatically obtain the other time-frequency resource subunit based on a preset relationship between the first time-frequency resource subunit and the second time-frequency resource subunit.

Figure 7A:
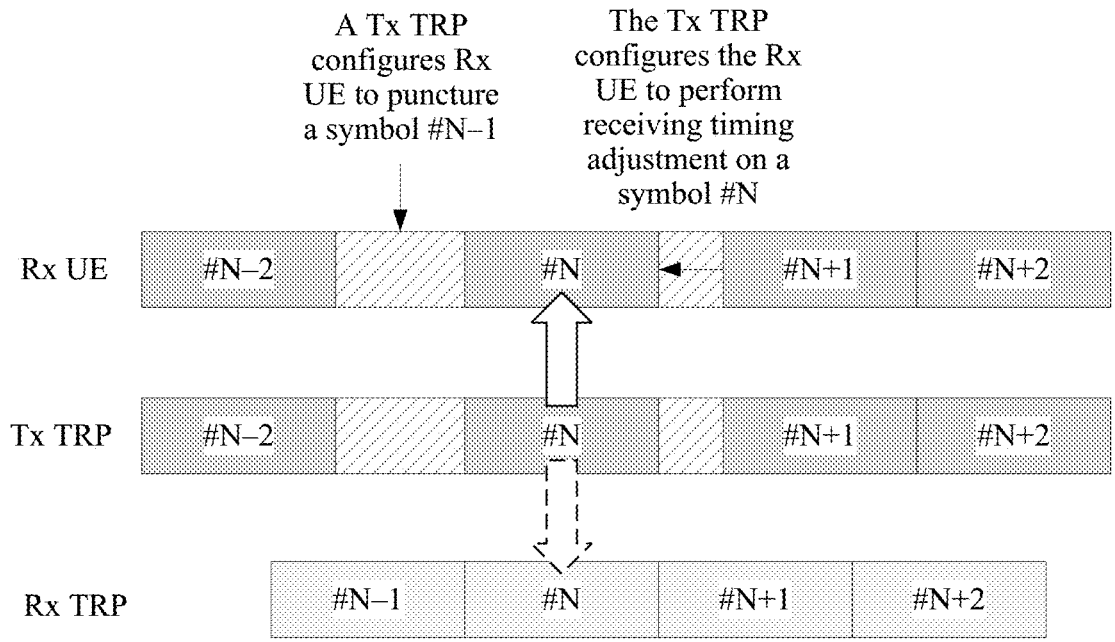
FIG. 7a is a schematic diagram of timing adjustment according to an embodiment of the present invention.

The configuration information in this embodiment of the present invention may be configuration information sent by the network device to all user equipments in a cell of the network device, namely, cell-specific information. In this case, the application scenario may be as follows: A measurement signal is transmitted between the network device and another network device. As shown in FIG. 7a, a Tx TRP is a network device that sends a measurement signal, an Rx TRP is a network device that receives the measurement signal, and Rx UE is user equipment of the Tx TRP. One of user equipments is used herein as an example for description, and other user equipments perform adjustment in a same manner. As a transmit end, the Tx TRP needs to perform timing adjustment. As shown in the figure, for example, a transmit network device Tx TRP is a downlink TRP and a receive network device Rx TRP uplink is an uplink TRP. If the transmit network device Tx TRP needs to send or receive the measurement signal on a symbol # N, the transmit network device Tx TRP needs to perform sending timing adjustment. As shown in the figure, the Tx TRP reserves a symbol # N−1, and advances timing of the symbol # N (a timing offset), so that symbols # N of the Tx TRP and the Rx TRP can be aligned to transmit and receive a measurement signal.

Correspondingly, to avoid affecting behavior of the user equipment, in other words, to prevent the user equipment from incorrectly transmitting and receiving data, the user equipment also needs to adjust the resource mapping manner and/or the rate matching manner based on the configuration information. For example, if the user equipment cannot identify the measurement signal and downlink data that is sent by the network device, the user equipment cannot receive the data on both the symbols # N−1 and # N. As shown in FIG. 7a, if the user equipment can obtain, through parsing, the measurement signal and downlink data that is sent on a network side, the user equipment needs to advance the timing of the symbol # N to accurately receive the measurement signal carried on the symbol # N and the downlink data sent on the network side.

Figure 7B:
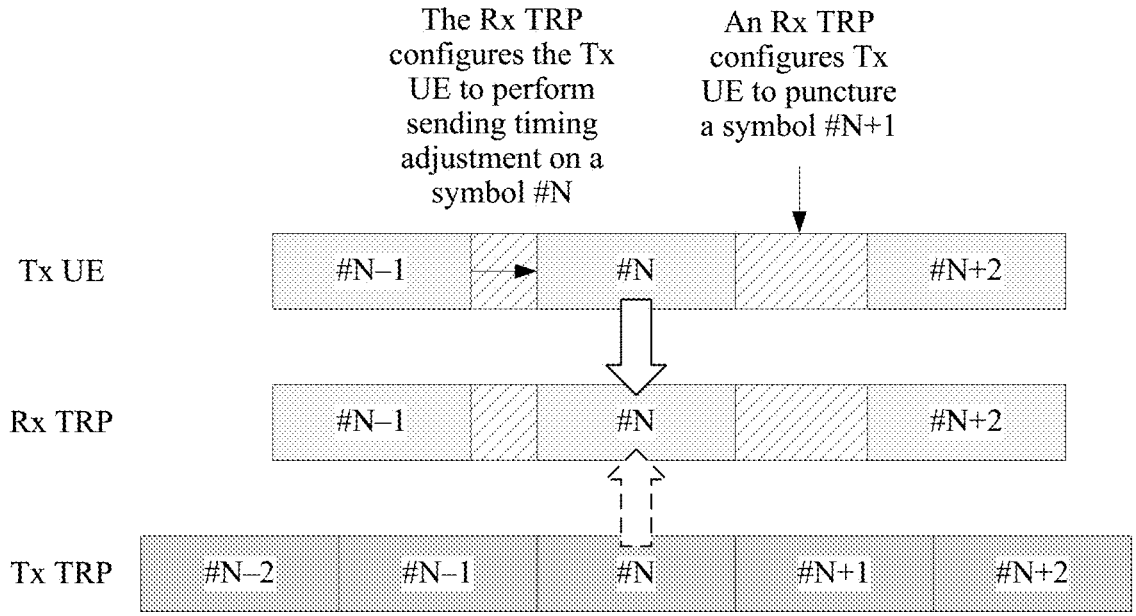
FIG. 7b is another schematic diagram of timing adjustment according to an embodiment of the present invention.

As shown in FIG. 7b, a receive network device Rx TRP may alternatively perform timing adjustment before a measurement signal is sent or received between network devices in neighboring cells. If the receive network device Rx TRP needs to send or receive the measurement signal on a symbol # N, the receive network device Rx TRP needs to perform receiving timing adjustment. As shown in the figure, the Rx TRP reserves a symbol # N+1, and delays timing of the symbol # N, so that symbols # N of a Tx TRP and the Rx TRP can be aligned to transmit and receive a measurement signal.

Correspondingly, to avoid affecting behavior of the user equipment, in other words, to prevent the user equipment from incorrectly transmitting and receiving data, the user equipment also needs to adjust the resource mapping manner and/or the rate matching manner based on the configuration information. For example, if the user equipment cannot identify the measurement signal and downlink data that is sent by the network device, the user equipment cannot receive the data on both the symbols # N and # N+1. As shown in FIG. 7b, if the user equipment can obtain, through parsing, the measurement signal and downlink data that is sent on a network side, the user equipment needs to reserve the symbol # N+1, and delay the timing of the symbol # N to accurately receive the measurement signal carried on the symbol # N and the downlink data sent on the network side.

Figure 7C:
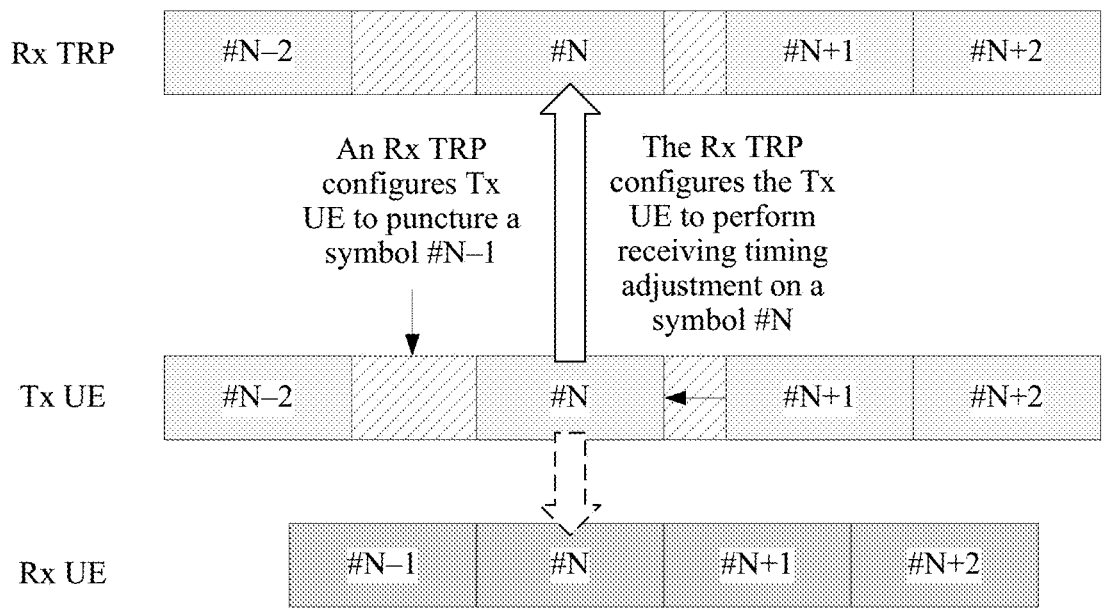
FIG. 7c is still another schematic diagram of timing adjustment according to an embodiment of the present invention.

The configuration information in this embodiment of the present invention may be configuration information sent by the network device to specific user equipment in a cell of the network device, namely, user-specific information. In this case, the application scenario may be as follows: A measurement signal is transmitted between the user equipment and user equipment in a cell adjacent to the cell to which the user equipment belongs. Referring to FIG. 7c, user equipment that sends a measurement signal is Tx UE, user equipment that receives the measurement signal is Rx UE, and an Rx TRP is a network device in a cell to which the Tx UE belongs. Sending/receiving timing needs to be performed before a measurement signal is sent or received between user equipments in neighboring cells. As shown in FIG. 7c, for example, transmit user equipment Tx UE is uplink UE and receive user equipment Rx UE is downlink UE. If the transmit user equipment Tx UE needs to send or receive the measurement signal on a symbol # N, the transmit user equipment Tx UE needs to perform sending timing adjustment. As shown in the figure, the Tx UE reserves a symbol # N−1, and advances timing of the symbol # N, so that symbols # N of the Tx UE and the Rx UE can be aligned to transmit and receive a measurement signal. Further, optionally, if the Rx TRP can obtain, through parsing, the measurement signal and uplink data that is sent by the user equipment, the Rx TRP performs same timing adjustment as the Tx UE, and receives the uplink data. If the Rx TRP cannot obtain, through parsing, the measurement signal and uplink data that is sent by the user equipment, the Rx TRP does not receive the uplink data on both the symbols # N−1 and # N.

Figure 7D:
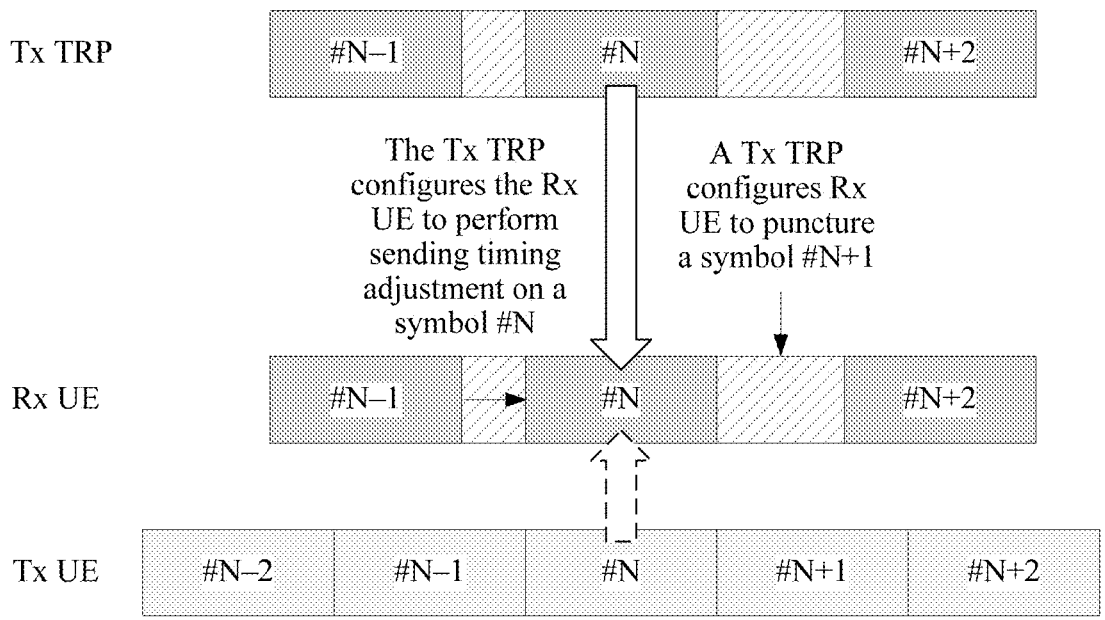
FIG. 7d is yet another schematic diagram of timing adjustment according to an embodiment of the present invention.

Referring to FIG. 7d, user equipment that sends a measurement signal is Tx UE, user equipment that receives the measurement signal is Rx UE, and a Tx TRP is a network device in a cell to which the Rx UE belongs. Sending/receiving timing needs to be performed before a measurement signal is sent or received between user equipments in neighboring cells. As shown in FIG. 7d, for example, receive user equipment Rx UE is downlink UE and transmit user equipment Tx UE is uplink UE. If the receive user equipment Rx UE needs to send or receive the measurement signal on a symbol # N, the receive user equipment Rx UE needs to perform receiving timing adjustment. As shown in the figure, the Rx UE reserves a symbol # N+1, and delays timing of the symbol # N, so that symbols # N of the Tx UE and the Rx UE can be aligned to transmit and receive a measurement signal. Further, optionally, if the Tx TRP can obtain, through parsing, the measurement signal and uplink data that is sent by the user equipment, the Tx TRP performs same timing adjustment as the Rx UE, and sends downlink data. If the Rx TRP cannot obtain, through parsing, the measurement signal and uplink data that is sent by the user equipment, the Rx TRP does not send downlink data on both the symbols # N and # N+1.

In this embodiment of the present invention, the user equipment receives the configuration information sent by the network device, where the configuration information indicates the at least one time interval and the at least one time-frequency resource unit within the time interval, and the time-frequency resource unit includes the first time-frequency resource subunit and/or the second time-frequency resource subunit. The user equipment reconfigures the resource mapping manner and/or the rate matching manner based on the configuration information, so that no downlink receiving or uplink sending is performed by the user equipment on the first time-frequency resource subunit, and adjusts the timing offset of the second time-frequency resource subunit to perform downlink receiving or uplink sending on the second time-frequency resource subunit obtained by adjusting the timing offset. This manner can ensure that data is accurately transmitted and received between the user equipment and the network device.

Figure 5:
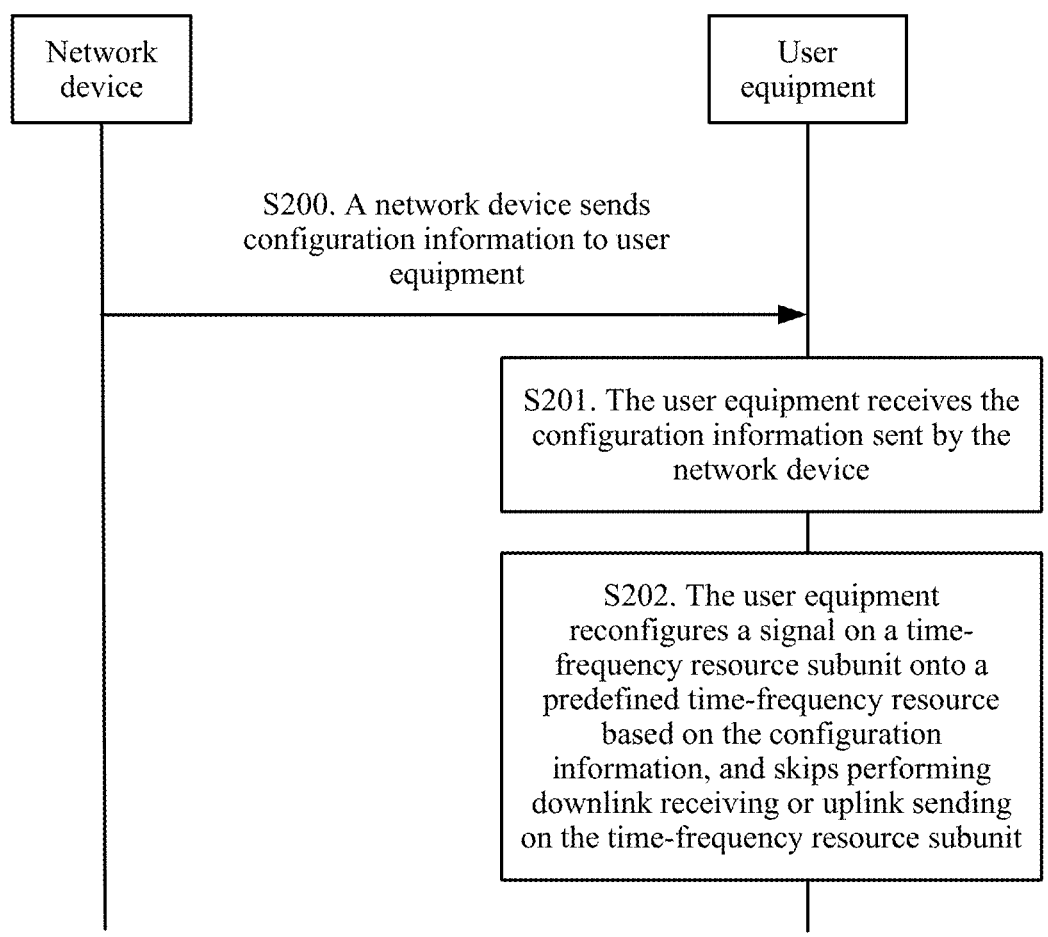
FIG. 5 is a schematic flowchart of another resource configuration method according to an embodiment of the present invention.

FIG. 5 is a schematic flowchart of another resource configuration method according to an embodiment of the present invention. As shown in the figure, the resource configuration method in this embodiment of the present invention includes the following steps.

S200. A network device sends configuration information to user equipment, where the configuration information is used to indicate at least one time interval and at least one time-frequency resource subunit within the time interval, so that the user equipment reconfigures a signal on the time-frequency resource subunit onto a predefined time-frequency resource.

The configuration information indicates a measurement period of signal measurement, in other words, indicates the at least one time interval to the user equipment. For example, the network device performs one time of signal measurement every 10 time intervals or indicates an identifier of the at least one time interval.

Optionally, the configuration information may be dynamic signaling or semi-static signaling in a specific format. The specific format may be a field in a specific length, a field with a specific meaning, or the like. When detecting the specific format, the user equipment may reconfigure, onto the predefined time-frequency resource based on the configuration information, the signal on the time-frequency resource subunit indicated by the configuration information.

S201. The user equipment receives the configuration information sent by the network device, where the configuration information is used to indicate the at least one time interval and the at least one time-frequency resource subunit within the time interval.

S202. The user equipment reconfigures the signal on the time-frequency resource subunit onto the predefined time-frequency resource based on the configuration information, and skips performing downlink receiving or uplink sending on the time-frequency resource subunit.

In this embodiment of the present invention, the user equipment reconfigures, onto the predefined time-frequency resource, the signal on the time-frequency resource subunit indicated by the configuration information. The signal may include at least one of a reference signal, a control signal, and data information. To be specific, the signal is a signal originally sent on the time-frequency resource subunit.

The predefined time-frequency resource in this embodiment of the present invention may be a basic time domain unit that includes a preset index. For example, the predefined time-frequency resource may be a basic time domain unit on a time domain symbol # N. To be specific, a signal on any time-frequency subunit is mapped to the basic time domain unit on the time domain symbol # N. Alternatively, the predefined time-frequency resource may be a time-frequency resource that differs by a preset quantity of basic time domain units from the indicated time-frequency resource subunit in time domain. For example, the predefined time-frequency resource is a time-frequency resource that differs by two basic time domain units from the indicated time-frequency resource subunit in time domain. Alternatively, the predefined time-frequency resource may be a time-frequency resource that differs by a first preset quantity of basic time domain units from the indicated time-frequency resource subunit in time domain and that differs by a second preset quantity of basic frequency domain units from the indicated time-frequency resource subunit in frequency domain.

In this embodiment of the present invention, after an original signal on the time-frequency resource subunit is mapped to the predefined time-frequency resource, the time-frequency resource subunit may be used to transmit and receive a measurement signal between network devices, or the time-frequency resource subunit may be used to transmit and receive a measurement signal between user equipments.

Figure 8A:
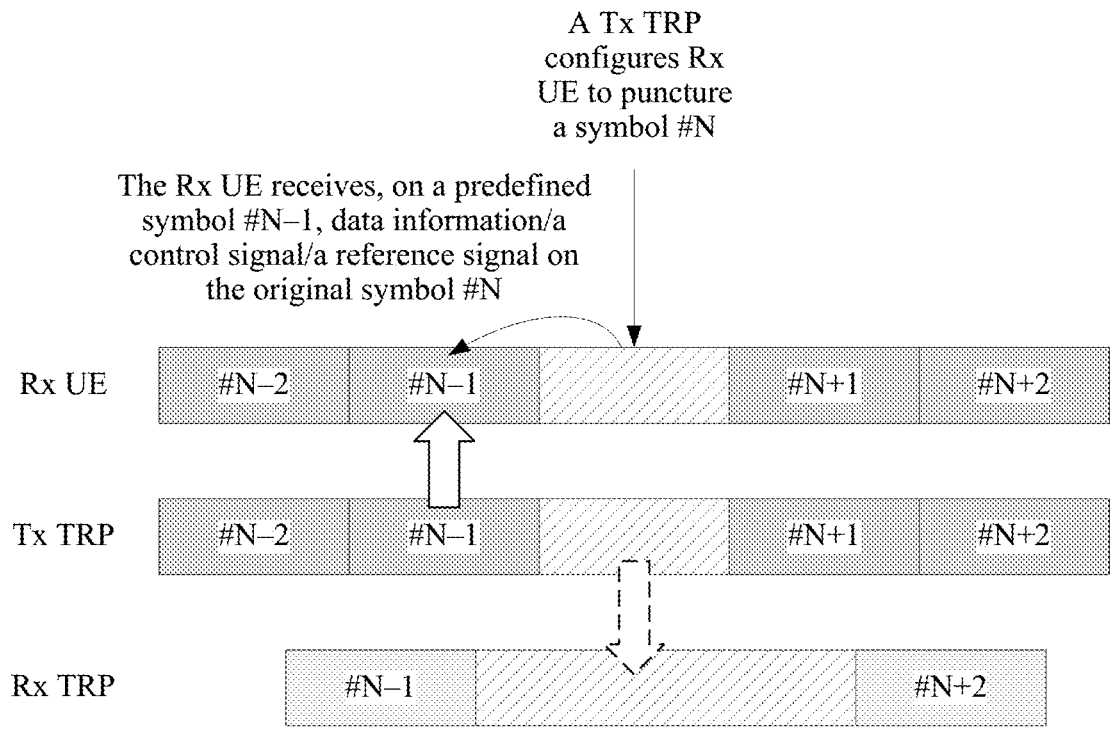
FIG. 8a is a schematic diagram of resource mapping according to an embodiment of the present invention.

As shown in FIG. 8a, the time-frequency resource subunit is mainly used to transmit and receive a measurement signal between network devices. A Tx TRP is a network device that sends a measurement signal, an Rx TRP is a network device that receives the measurement signal, and Rx UE is user equipment of the Tx TRP. One of user equipments is used herein as an example for description, and other user equipments perform adjustment in a same manner. The Tx TRP sends the measurement signal on a symbol # N, but the user equipment cannot obtain the measurement signal and downlink data through parsing. Consequently, the user equipment cannot perform downlink receiving on the symbol # N. To avoid affecting a signal of the user equipment on the original symbol # N, the user equipment reconfigures the signal on the symbol # N onto a predefined time-frequency resource symbol # N−1. In this way, the user equipment is not affected by transmission and reception of the measurement signal between the Tx TRP and the Rx TRP.

Figure 8B:
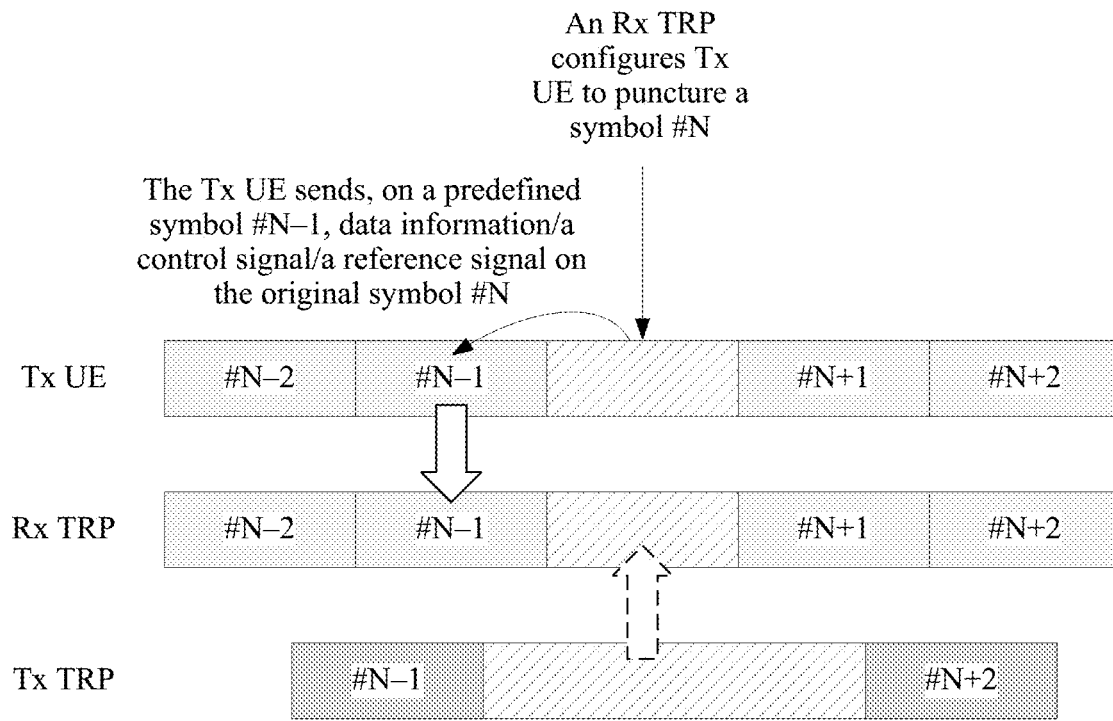
FIG. 8b is another schematic diagram of resource mapping according to an embodiment of the present invention.

As shown in FIG. 8b, the time-frequency resource subunit is mainly used to transmit and receive a measurement signal between network devices. A Tx TRP is a network device that sends a measurement signal, an Rx TRP is a network device that receives the measurement signal, and Tx UE is user equipment of the Rx TRP. One of user equipments is used herein as an example for description, and other user equipments perform adjustment in a same manner. The Tx TRP sends the measurement signal on a symbol # N, but the Rx TRP cannot obtain the measurement signal and uplink data through parsing. Consequently, the user equipment cannot perform uplink sending on the symbol # N. To avoid affecting a signal of the user equipment on the original symbol # N, the user equipment reconfigures the signal on the symbol # N onto a predefined time-frequency resource symbol # N−1. In this way, the user equipment is not affected by transmission and reception of the measurement signal between the Tx TRP and the Rx TRP.

It may be understood that after the signal on the time-frequency resource subunit indicated by the configuration information is reconfigured onto the predefined time-frequency resource, the time-frequency resource subunit may be used to transmit and receive the measurement signal between the user equipments. To be specific, both the Tx UE and the Rx UE reconfigure the signal on the time-frequency resource subunit onto the predefined time-frequency resource, and then the Tx UE sends the measurement signal to the Rx UE on the time-frequency resource subunit.

In this embodiment of the present invention, the user equipment receives the configuration information sent by the network device, where the configuration information is used to indicate the at least one time interval and the at least one time-frequency resource subunit within the time interval. The user equipment reconfigures the signal on the time-frequency resource subunit onto the predefined time-frequency resource based on the configuration information, and skips performing downlink receiving or uplink sending on the time-frequency resource subunit. In this way, the time-frequency resource subunit may be used to transmit a measurement signal between user equipments, transmit a measurement signal between network devices, or the like without affecting sending of an original signal, so that resource utilization is improved, and sending of an existing signal is not affected.

Figure 9A:
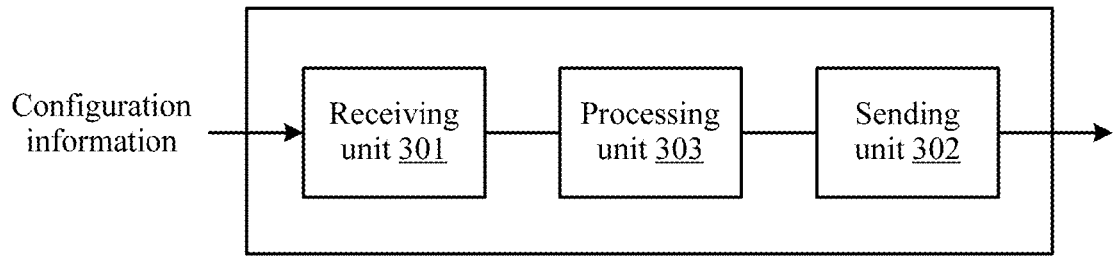
FIG. 9a is a schematic structural diagram of a resource configuration apparatus according to an embodiment of the present invention.
Figure 9B:
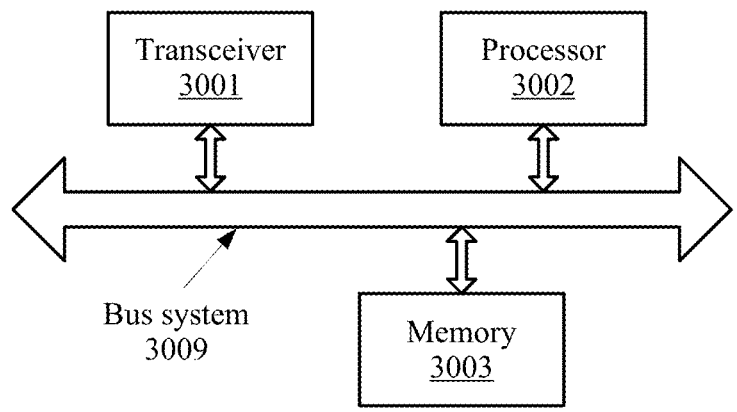
FIG. 9b is a schematic structural diagram of another resource configuration apparatus according to an embodiment of the present invention.

FIG. 9a and FIG. 9b are schematic structural diagrams of a resource configuration apparatus according to embodiments of the present invention. As shown in FIG. 9a, the apparatus may include a receiving unit 301, a sending unit 302, and a processing unit 303.

The receiving unit 301 may be configured to perform a receiving action that is performed by user equipment and that is described in the method in FIG. 4.

The sending unit 302 may be configured to perform a sending action that is performed by the user equipment and that is described in the method in FIG. 4.

The processing unit 303 may be configured to: perform corresponding processing, which is described in the foregoing method, on a signal received by the receiving unit 301; and/or perform corresponding processing, which is described in the foregoing method, on a signal to be sent by the sending unit 302, and send the signal by using the sending unit 302.

The receiving unit 301 and the sending unit 302 may be implemented by using a transceiver 3001 in FIG. 9b. The processing unit 303 may be implemented by using a processor 3002, or implemented by using a processor 3002 and a memory 3003.

For specific details, refer to the description in the foregoing method. The details are not described herein.

For example, the receiving unit 301 may be configured to receive configuration information sent by a network device, where the configuration information is used to indicate at least one time interval and at least one time-frequency resource unit within the time interval, and the time-frequency resource unit includes a first time-frequency resource subunit and/or a second time-frequency resource subunit.

The processing unit 303 may be configured to: reconfigure a resource mapping manner and/or a rate matching manner based on the configuration information, so that no downlink receiving or uplink sending is performed by the user equipment on the first time-frequency resource subunit, and adjust a timing offset of the second time-frequency resource subunit to perform downlink receiving or uplink sending on the second time-frequency resource subunit obtained by adjusting the timing offset.

Correspondingly, as shown in FIG. 9b, the apparatus may include the transceiver 3001 and the processor 3002. The processor 3002 is configured to control an operation of the apparatus, and the operation includes: transmitting (including receiving and/or sending) data by using the transceiver 3001. The apparatus may further include the memory 3003. The memory 3003 may include a read-only memory and a random access memory, and is configured to provide an instruction and data for the processor 3002. The memory 3003 may be integrated into the processor 3002, or may be independent of the processor 3002. A part of the memory 3003 may further include a non-volatile random access memory (NVRAM). Components of the apparatus are coupled together by using a bus system. In addition to a data bus, the bus system 3009 includes a power bus, a control bus, and a status signal bus. However, for clear description, various buses are marked as the bus system 3009 in the figure.

The procedure disclosed in this embodiment of this application may be applied to the processor 3002, or implemented by the processor 3002. In an implementation process, each step of the procedure implemented by the apparatus may be completed by using an integrated logic circuit of hardware in the processor 3002 or an instruction in a form of software. The processor 3002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 3003, and the processor 3002 reads information in the memory 3003 and completes, in combination with hardware of the processor, the steps of the procedure indicated in the embodiments of the present invention.

Further, when the apparatus is user equipment, the apparatus may further include an input device such as a keyboard, an output device such as a display, and the like. Details are not described herein.

Based on a same technical concept, an embodiment of the present invention further provides a resource configuration apparatus. The apparatus may be the network device described in the foregoing method, and more specifically, may be a transmission point such as a base station, or may be a device that can implement a corresponding function of the network device described in the foregoing method.

Figure 10A:
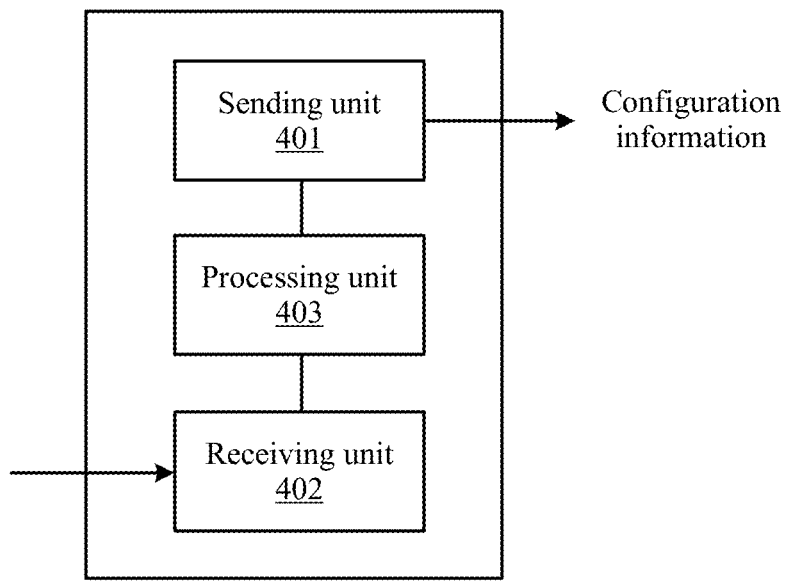
FIG. 10a is a schematic structural diagram of another resource configuration apparatus according to an embodiment of the present invention.
Figure 10B:
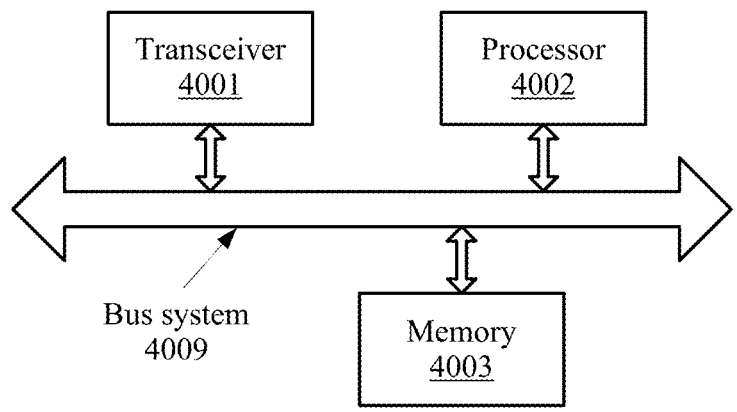
FIG. 10b is a schematic structural diagram of another resource configuration apparatus according to an embodiment of the present invention.

FIG. 10a and FIG. 10b are schematic structural diagrams of a resource configuration apparatus according to embodiments of the present invention. As shown in FIG. 10a, the apparatus may include a sending unit 401, a receiving unit 402, and a processing unit 403.

The sending unit 401 may be configured to perform a sending action that is performed by a network device and that is described in the method in FIG. 4.

The receiving unit 402 may be configured to perform a receiving action that is performed by the network device and that is described in the method in FIG. 4.

The processing unit 403 may be configured to: perform corresponding processing, which is described in the foregoing method, on a signal received by the receiving unit 402; and/or perform corresponding processing, which is described in the foregoing method, on a signal to be sent by the sending unit 401, and send the signal by using the sending unit 401.

The receiving unit 402 and the sending unit 401 may be implemented by using a transceiver 4001 in FIG. 10b. The processing unit 403 may be implemented by using a processor 4002, or implemented by using a processor 4002 and a memory 4003.

For specific details, refer to the description in the foregoing method. The details are not described herein.

For example, the sending unit 401 may be configured to send configuration information to all user equipments in a cell of the network device, where the configuration information is used to indicate at least one time interval and at least one time-frequency resource unit within the time interval, and the time-frequency resource unit includes a first time-frequency resource subunit and/or a second time-frequency resource subunit.

As shown in FIG. 10b, the network device may include the transceiver 4001, the processor 4002, and the memory 4003.

The processor 4002 is configured to control an operation of the apparatus, and the operation includes: transmitting (including receiving and/or sending) data by using the transceiver 4001. The memory 4003 may include a read-only memory and a random access memory, and is configured to provide an instruction and data for the processor 4002. A part of the memory 4003 may further include a non-volatile random access memory (NVRAM). Components of the apparatus are coupled together by using a bus system. In addition to a data bus, the bus system 4009 includes a power bus, a control bus, and a status signal bus. However, for clear description, various buses are marked as the bus system 4009 in the figure.

The procedure disclosed in this embodiment of this application may be applied to the processor 4002, or implemented by the processor 4002. In an implementation process, each step of the procedure implemented by the apparatus may be completed by using an integrated logic circuit of hardware in the processor 4002 or an instruction in a form of software. The processor 4002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 4003, and the processor 4002 reads information in the memory 4003 and completes, in combination with hardware of the processor, the steps of the procedure indicated in the embodiments of the present invention.

When the network device is a base station, the network device may further include a communications interface module, configured to communicate with another base station or another network element such as a core network element.

An embodiment of this application further provides a system, including the foregoing apparatus configured to send configuration information and the foregoing apparatus configured to receive configuration information. The system may be a communications system or another system.

Figure 11A:
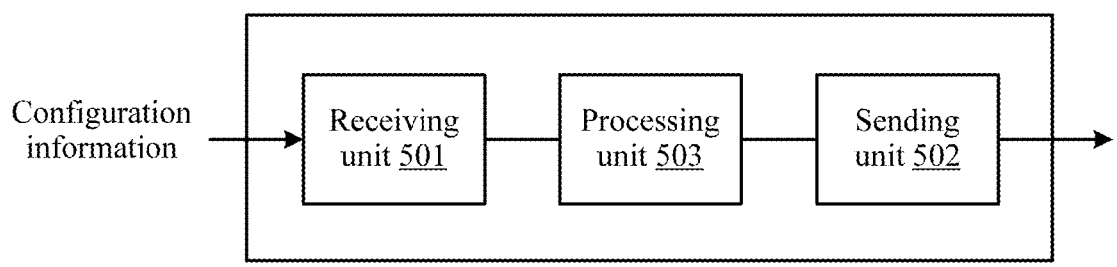
FIG. 11a is a schematic structural diagram of another resource configuration apparatus according to an embodiment of the present invention.
Figure 11B:
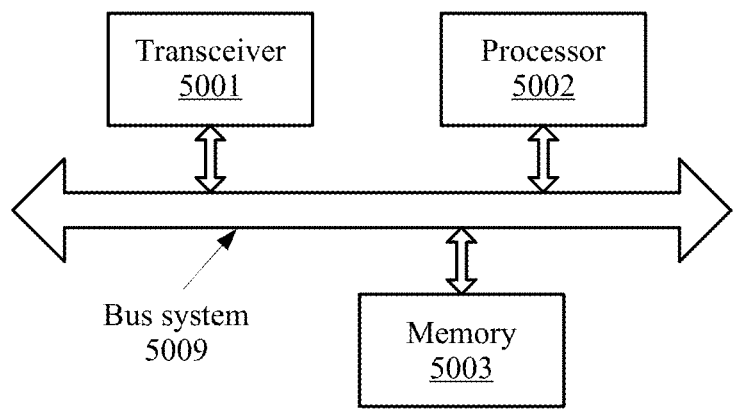
FIG. 11b is a schematic structural diagram of another resource configuration apparatus according to an embodiment of the present invention.

FIG. 11a and FIG. 11b are schematic structural diagrams of a resource configuration apparatus according to embodiments of the present invention. As shown in FIG. 11a, the apparatus may include a receiving unit 501, a sending unit 502, and a processing unit 503.

The receiving unit 501 may be configured to perform a receiving action that is performed by user equipment and that is described in the method in FIG. 5.

The sending unit 502 may be configured to perform a sending action that is performed by the user equipment and that is described in the method in FIG. 5.

The processing unit 503 may be configured to: perform corresponding processing, which is described in the foregoing method, on a signal received by the receiving unit 501; and/or perform corresponding processing, which is described in the foregoing method, on a signal to be sent by the sending unit 502, and send the signal by using the sending unit 502.

The receiving unit 501 and the sending unit 502 may be implemented by using a transceiver 5001 in FIG. 10b. The processing unit 503 may be implemented by using a processor 5002, or implemented by using a processor 5002 and a memory 5003.

For specific details, refer to the description in the foregoing method. The details are not described herein.

For example, the receiving unit 501 may be configured to receive configuration information sent by a network device, where the configuration information is used to indicate at least one time interval and at least one time-frequency resource subunit within the time interval.

The processing unit 503 may be configured to: reconfigure a signal on the time-frequency resource subunit onto a predefined time-frequency resource based on the configuration information, and skip performing downlink receiving or uplink sending on the time-frequency resource subunit.

Correspondingly, as shown in FIG. 11b, the apparatus may include the transceiver 5001 and the processor 5002. The processor 3002 is configured to control an operation of the apparatus, and the operation includes: transmitting (including receiving and/or sending) data by using the transceiver 5001. The apparatus may further include the memory 5003. The memory 5003 may include a read-only memory and a random access memory, and is configured to provide an instruction and data for the processor 5002. The memory 5003 may be integrated into the processor 5002, or may be independent of the processor 5002. A part of the memory 5003 may further include a non-volatile random access memory (NVRAM). Components of the apparatus are coupled together by using a bus system. In addition to a data bus, the bus system 5009 includes a power bus, a control bus, and a status signal bus. However, for clear description, various buses are marked as the bus system 5009 in the figure.

The procedure disclosed in this embodiment of this application may be applied to the processor 5002, or implemented by the processor 5002. In an implementation process, each step of the procedure implemented by the apparatus may be completed by using an integrated logic circuit of hardware in the processor 5002 or an instruction in a form of software. The processor 5002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 5003, and the processor 5002 reads information in the memory 5003 and completes, in combination with hardware of the processor, the steps of the procedure indicated in the embodiments of the present invention.

Further, when the apparatus is user equipment, the apparatus may further include an input device such as a keyboard, an output device such as a display, and the like. Details are not described herein.

Based on a same technical concept, an embodiment of the present invention further provides a resource configuration apparatus. The apparatus may be the network device described in the foregoing method, and more specifically, may be a transmission point such as a base station, or may be a device that can implement a corresponding function of the network device described in the foregoing method.

Figure 12A:
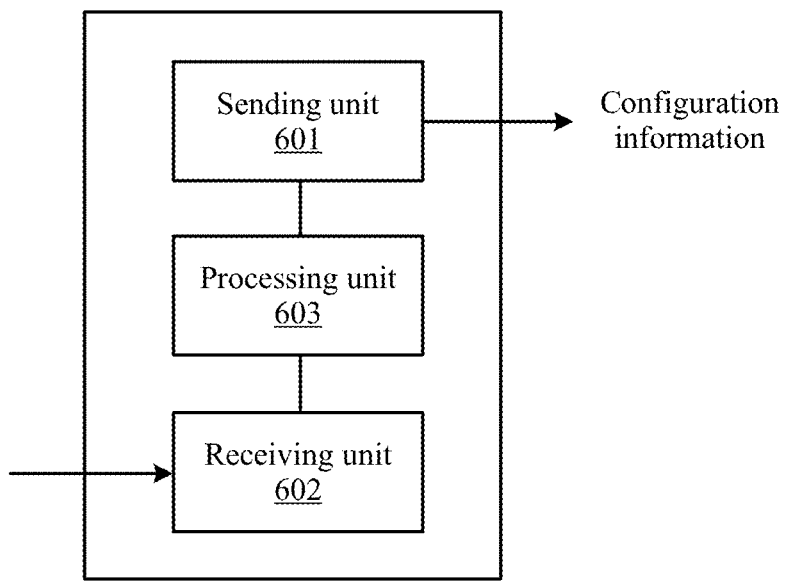
FIG. 12a is a schematic structural diagram of another resource configuration apparatus according to an embodiment of the present invention.
Figure 12B:
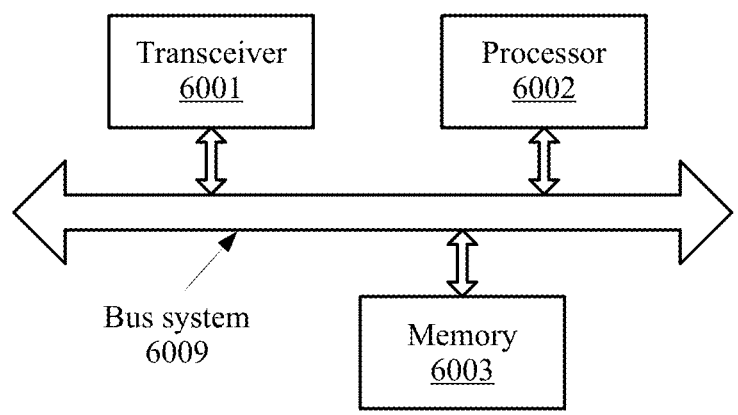
FIG. 12b is a schematic structural diagram of another resource configuration apparatus according to an embodiment of the present invention.

FIG. 12a and FIG. 12b are schematic structural diagrams of a resource configuration apparatus according to embodiments of the present invention. As shown in FIG. 12a, the apparatus may include a sending unit 601, a receiving unit 602, and a processing unit 603.

The sending unit 601 may be configured to perform a sending action that is performed by a network device and that is described in the method in FIG. 5.

The receiving unit 602 may be configured to perform a receiving action that is performed by the network device and that is described in the method in FIG. 5.

The processing unit 603 may be configured to: perform corresponding processing, which is described in the foregoing method, on a signal received by the receiving unit 602; and/or perform corresponding processing, which is described in the foregoing method, on a signal to be sent by the sending unit 601, and send the signal by using the sending unit 601.

The receiving unit 602 and the sending unit 601 may be implemented by using a transceiver 6001 in FIG. 12b. The processing unit 603 may be implemented by using a processor 6002, or implemented by using a processor 6002 and a memory 6003.

For specific details, refer to the description in the foregoing method. The details are not described herein.

For example, the sending unit 601 may be configured to send configuration information to user equipment, where the configuration information is used to indicate at least one time interval and at least one time-frequency resource subunit within the time interval, so that the user equipment reconfigures a signal on the time-frequency resource subunit onto a predefined time-frequency resource.

As shown in FIG. 12b, the network device may include the transceiver 6001, the processor 6002, and the memory 6003.

The processor 6002 is configured to control an operation of the apparatus, and the operation includes: transmitting (including receiving and/or sending) data by using the transceiver 6001. The memory 6003 may include a read-only memory and a random access memory, and is configured to provide an instruction and data for the processor 6002. A part of the memory 6003 may further include a non-volatile random access memory (NVRAM). Components of the apparatus are coupled together by using a bus system. In addition to a data bus, the bus system 6009 includes a power bus, a control bus, and a status signal bus. However, for clear description, various buses are marked as the bus system 6009 in the figure.

The procedure disclosed in this embodiment of this application may be applied to the processor 6002, or implemented by the processor 6002. In an implementation process, each step of the procedure implemented by the apparatus may be completed by using an integrated logic circuit of hardware in the processor 6002 or an instruction in a form of software. The processor 6002 may be a general purpose processor, a digital signal processor, an application-specific integrated circuit, a field programmable gate array or another programmable logic device, a discrete gate or a transistor logic device, or a discrete hardware component, and may implement or execute the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 6003, and the processor 6002 reads information in the memory 6003 and completes, in combination with hardware of the processor, the steps of the procedure indicated in the embodiments of the present invention.

When the network device is a base station, the network device may further include a communications interface module, configured to communicate with another base station or another network element such as a core network element.

An embodiment of this application further provides a system, including the foregoing apparatus configured to send configuration information and the foregoing apparatus configured to receive configuration information. The system may be a communications system or another system.

In accordance with an example of the invention, this application further provides the following embodiments:

Embodiment 1

A communications apparatus, comprising a memory to store an instruction; and a processor to execute the instruction, to configure the apparatus to execute a method of resource configuration, comprising: receiving from a network device configuration information used to indicate at least one time interval and at least one time-frequency resource unit within the time interval, and the time-frequency resource unit comprises a first time-frequency resource subunit and/or a second time-frequency resource subunit; and reconfiguring a resource mapping manner and/or a rate matching manner based on the configuration information, so that no downlink receiving or uplink sending is performed by user equipment on the first time-frequency resource subunit, and adjusting a timing offset of the second time-frequency resource subunit to perform downlink receiving or uplink sending on the second time-frequency resource subunit obtained by adjusting the timing offset.

Embodiment 2

A non-transitory computer readable storage medium, comprising a computer program, wherein when the computer program is executed by a computer, the computer program controls the computer to execute a method of resource configuration, comprising: receiving from a network device configuration information used to indicate at least one time interval and at least one time-frequency resource unit within the time interval, and the time-frequency resource unit comprises a first time-frequency resource subunit and/or a second time-frequency resource subunit; and reconfiguring a resource mapping manner and/or a rate matching manner based on the configuration information, so that no downlink receiving or uplink sending is performed by user equipment on the first time-frequency resource subunit, and adjusting a timing offset of the second time-frequency resource subunit to perform downlink receiving or uplink sending on the second time-frequency resource subunit obtained by adjusting the timing offset.

Embodiment 3

A communications apparatus comprising: a memory to store an instruction; and a processor to execute the instruction to configure the apparatus to execute a method of resource configuration, comprising: sending to all user equipments in a cell of the network device configuration information used to indicate at least one time interval and at least one time-frequency resource unit within the time interval, and the time-frequency resource unit comprises a first time-frequency resource subunit and/or a second time-frequency resource subunit.

Embodiment 4

A communications apparatus comprising: a memory to store an instruction; and a processor to execute the instruction to configure the apparatus to execute a method of resource configuration, comprising: receiving from a network device configuration information used to indicate at least one time interval and at least one time-frequency resource subunit within the time interval; and reconfiguring a signal on the time-frequency resource subunit onto a predefined time-frequency resource based on the configuration information, and skipping performing downlink receiving or uplink sending on the time-frequency resource subunit.

Embodiment 5

A communications apparatus comprising: a memory to store an instruction; and a processor to execute the instruction to configure the apparatus to execute a method of resource configuration, comprising: sending to user equipment configuration information used to indicate at least one time interval and at least one time-frequency resource subunit within the time interval, so that the user equipment reconfigures a signal on the time-frequency resource subunit onto a predefined time-frequency resource.

Embodiment 6

A non-transitory computer readable storage medium, comprising a computer program, wherein when the computer program is executed by a computer, the computer program controls the computer to execute a method of resource configuration, comprising: sending to all user equipments in a cell of the network device configuration information used to indicate at least one time interval and at least one time-frequency resource unit within the time interval, and the time-frequency resource unit comprises a first time-frequency resource subunit and/or a second time-frequency resource subunit.

Embodiment 7

A non-transitory computer readable storage medium, comprising a computer program, wherein when the computer program is executed by a computer, the computer program controls the computer to execute a method of resource configuration, comprising: receiving from a network device configuration information used to indicate at least one time interval and at least one time-frequency resource subunit within the time interval; and reconfiguring a signal on the time-frequency resource subunit onto a predefined time-frequency resource based on the configuration information, and skipping performing downlink receiving or uplink sending on the time-frequency resource subunit.

Embodiment 8

A non-transitory computer readable storage medium, comprising a computer program, wherein when the computer program is executed by a computer, the computer program controls the computer to execute a method of resource configuration, comprising: sending to user equipment configuration information used to indicate at least one time interval and at least one time-frequency resource subunit within the time interval, so that the user equipment reconfigures a signal on the time-frequency resource subunit onto a predefined time-frequency resource.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a random access memory RAM, a magnetic disk, or an optical disc.

What is claimed is:

1. A method of resource configuration, the method comprising:
    receiving, from a network device, configuration information used to indicate at least one time interval and at least one time-frequency resource unit within the at least one time interval, wherein the at least one time-frequency resource unit comprises at least one of a first time-frequency resource subunit or a second time-frequency resource subunit; and
    reconfiguring at least one of a resource mapping manner or a rate matching manner based on the configuration information, so that no downlink receiving or uplink sending is performed by a user equipment on the first time-frequency resource subunit, and adjusting a timing offset of the second time-frequency resource subunit to perform downlink receiving or uplink sending on the second time-frequency resource subunit obtained by adjusting the timing offset;
    wherein the first time-frequency resource subunit is located on a time domain resource on which an index of a start basic time domain unit is M and an index of an end basic time domain unit is N, and one basic time domain unit is corresponding to one index; and
    wherein the second time-frequency resource subunit is located on:
        a time domain resource on which an index of an end basic time domain unit is M−1 and an index of a start basic time domain unit is MA; or
        a time domain resource on which an index of a start basic time domain unit is N+1 and an index of an end basic time domain unit is N+A,
        wherein A is a preset quantity of basic time domain units comprised in the second time-frequency resource subunit.

2. The method according to claim 1, wherein the configuration information is dynamic signaling or semi-static signaling in a specific format.

3. The method according to claim 1, wherein:
    the second time-frequency resource subunit obtained by adjusting the timing offset is used to transmit a measurement signal between the network device and another network device; or
    the second time-frequency resource subunit obtained by adjusting the timing offset is used to transmit a measurement signal between the user equipment and another user equipment in a cell adjacent to a cell to which the user equipment belongs.

4. The method according to claim 1, wherein the receiving the configuration information from the network device comprises:
    receiving first configuration information from the network device, wherein the first configuration information is used to indicate the at least one time interval; and
    receiving second configuration information from the network device, wherein the second configuration information is used to indicate the at least one time-frequency resource unit within the at least one time interval.

5. The method according to claim 1, wherein a time domain resource of the at least one time-frequency resource unit comprises at least one basic time domain unit; and the configuration information comprises the index of the start basic time domain unit on the time domain resource of the first time-frequency resource subunit within the time interval and a total quantity of basic time domain units on the time domain resource of the first time-frequency resource subunit within the time interval; or the configuration information comprises the index of the start basic time domain unit on the time domain resource of the first time-frequency resource subunit within the time interval and the index of the end basic time domain unit on the time domain resource of the first time-frequency resource subunit within the time interval.

6. The method according to claim 1, wherein a frequency domain resource of the at least one time-frequency resource unit comprises at least one basic frequency domain unit; and the configuration information comprises an index of a start basic frequency domain unit on a frequency domain resource of the first time-frequency resource subunit within the time interval and a total quantity of basic frequency domain units on the frequency domain resource of the first time-frequency resource subunit within the time interval; or the configuration information comprises an index of a start basic frequency domain unit on a frequency domain resource of the first time-frequency resource subunit within the time interval and an index of an end basic frequency domain unit on the frequency domain resource of the first time-frequency resource subunit within the time interval.

7. The method according to claim 1, wherein a time domain resource of the at least one time-frequency resource unit comprises at least one basic time domain unit; and the configuration information comprises the index of the start basic time domain unit on the time domain resource of the second time-frequency resource subunit within the time interval and the total quantity of basic time domain units on the time domain resource of the second time-frequency resource subunit within the time interval; or the configuration information comprises the index of the start basic time domain unit on the time domain resource of the second time-frequency resource subunit within the time interval and the index of the end basic time domain unit on the time domain resource of the second time-frequency resource subunit within the time interval.

8. The method according to claim 1, wherein a frequency domain resource of the at least one time-frequency resource unit comprises at least one basic frequency domain unit; and the configuration information comprises an index of a start basic frequency domain unit on a frequency domain resource of the second time-frequency resource subunit within the time interval and a total quantity of basic frequency domain units on the frequency domain resource of the second time-frequency resource subunit within the time interval; or the configuration information comprises an index of a start basic frequency domain unit on a frequency domain resource of the second time-frequency resource subunit within the time interval and an index of an end basic frequency domain unit on the time domain resource of the second time-frequency resource subunit within the time interval.

9. The method according to claim 1, wherein the configuration information comprises a preset format identifier corresponding to the first time-frequency resource subunit within the time interval or a preset format identifier corresponding to the second time-frequency resource subunit within the time interval, wherein one time-frequency resource subunit is corresponding to one preset format identifier.

10. The method according to claim 1, wherein the configuration information is carried in dynamic signaling or semi-static signaling; and in response to receiving the dynamic signaling and the semi-static signaling, selecting the dynamic signaling or the semi-static signaling based on a preset priority, and obtaining the configuration information from the selected signaling.

11. A method of resource configuration, the method comprising:

sending, by a network device to each user equipment in a cell of the network device, configuration information used to indicate at least one time interval and at least one time-frequency resource unit within the at least one time interval, wherein the at least one time-frequency resource unit comprises at least one of a first time-frequency resource subunit or a second time-frequency resource subunit;

wherein the first time-frequency resource subunit is located on a time domain resource on which an index of a start basic time domain unit is M and an index of an end basic time domain unit is N, and one basic time domain unit is corresponding to one index; and wherein the second time-frequency resource subunit is located on:

a time domain resource on which an index of an end basic time domain unit is M−1 and an index of a start basic time domain unit is MA; or a time domain resource on which an index of a start basic time domain unit is N+1 and an index of an end basic time domain unit is N+A, wherein A is a preset quantity of basic time domain units comprised in the second time-frequency resource subunit.

12. The method according to claim 11, wherein the configuration information is dynamic signaling or semi-static signaling in a specific format.

13. The method according to claim 11, further comprising:

transmitting a measurement signal with another network device on the second time-frequency resource subunit obtained by adjusting a timing offset.

14. A method of resource configuration, comprising:

receiving, from a network device, configuration information used to indicate at least one time interval and at least one time-frequency resource unit within the at least one time interval, wherein the at least one time-frequency resource unit comprises at least one of a first time-frequency resource subunit or a second time-frequency resource subunit; and reconfiguring a signal on the at least one time-frequency resource unit onto a predefined time-frequency resource based on the configuration information, and skipping performing downlink receiving or uplink sending on the at least one time-frequency resource unit;

wherein the first time-frequency resource subunit is located on a time domain resource on which an index of a start basic time domain unit is M and an index of an end basic time domain unit is N, and one basic time domain unit is corresponding to one index; and wherein the second time-frequency resource subunit is located on:
- a time domain resource on which an index of an end basic time domain unit is M−1 and an index of a start basic time domain unit is M-A; or
- a time domain resource on which an index of a start basic time domain unit is N+1 and an index of an end basic time domain unit is N+A, wherein A is a preset quantity of basic time domain units comprised in the second time-frequency resource subunit.

15. The method according to claim 14, wherein the signal on the at least one time-frequency resource unit comprises at least one of data information, a control signal, or a reference signal.

16. The method according to claim 14, wherein
the predefined time-frequency resource is a basic time domain unit that comprises a preset index; or
the predefined time-frequency resource is a time-frequency resource that differs by a preset quantity of basic time domain units from the at least one time-frequency resource unit in time domain; or
the predefined time-frequency resource is a time-frequency resource that differs by a first preset quantity of basic time domain units from the at least one time-frequency resource unit in time domain and that differs by a second preset quantity of basic frequency domain units from the at least one time-frequency resource unit in frequency domain.

17. The method according to claim 14, wherein:
the at least one time-frequency resource unit is used to transmit a measurement signal between a user equipment and another user equipment in a cell adjacent to a cell to which the user equipment belongs; or
the at least one time-frequency resource unit is used to transmit a measurement signal between the network device and another network device.

18. A method of resource configuration, the method comprising:
sending, to a user equipment configuration information used to indicate at least one time interval and at least one time-frequency resource unit within the at least one time interval, to cause the user equipment to reconfigure a signal on the at least one time-frequency resource unit onto a predefined time-frequency resource, wherein the at least one time-frequency resource unit comprises at least one of a first time-frequency resource subunit or a second time-frequency resource subunit;

wherein the first time-frequency resource subunit is located on a time domain resource on which an index of a start basic time domain unit is M and an index of an end basic time domain unit is N, and one basic time domain unit is corresponding to one index; and wherein the second time-frequency resource subunit is located on:
- a time domain resource on which an index of an end basic time domain unit is M−1 and an index of a start basic time domain unit is M−A; or
- a time domain resource on which an index of a start basic time domain unit is N+1 and an index of an end basic time domain unit is N+A, wherein A is a preset quantity of basic time domain units comprised in the second time-frequency resource subunit.

19. The method according to claim 18, wherein:
the at least one time-frequency resource unit is used to transmit a measurement signal between a network device and another network device; or
the at least one time-frequency resource unit is used to transmit a measurement signal between the user equipment and another user equipment in a cell adjacent to a cell to which the user equipment belongs.

* * * * *

UNITED STATES PATENT AND TRADEMARK OFFICE
CERTIFICATE OF CORRECTION

PATENT NO. : 10,855,508 B2
APPLICATION NO. : 16/272748
DATED : December 1, 2020
INVENTOR(S) : Li et al.

Page 1 of 1

It is certified that error appears in the above-identified patent and that said Letters Patent is hereby corrected as shown below:

On the Title Page

Page 2, item (56) Other Publications Citation Number 4: "Czech RepuiJlic" should read -- Czech Republic --.

Page 2, item (56) Other Publications Citation Number 5: "Slaain" should read -- Spain --.

In the Claims

Claim 1: Column 30, Line 34: "domain unit is MA;" should read -- domain unit is M–A; --.

Claim 11: Column 32, Line 37: "domain unit is MA;" should read -- domain unit is M–A; --.

Signed and Sealed this
Thirty-first Day of May, 2022

Katherine Kelly Vidal
*Director of the United States Patent and Trademark Office*